US012254055B2

(12) United States Patent
Perelli-Minetti

(10) Patent No.: US 12,254,055 B2
(45) Date of Patent: Mar. 18, 2025

(54) ADAPTIVE COLLABORATION RECOMMENDATION PLATFORM

(71) Applicant: Block, Inc., San Francisco, CA (US)

(72) Inventor: Linnea Perelli-Minetti, Seattle, WA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 18/091,868

(22) Filed: Dec. 30, 2022

(65) Prior Publication Data

US 2024/0086480 A1    Mar. 14, 2024

Related U.S. Application Data

(60) Provisional application No. 63/405,386, filed on Sep. 9, 2022.

(51) Int. Cl.
*G06F 16/9536* (2019.01)
(52) U.S. Cl.
CPC ................. *G06F 16/9536* (2019.01)
(58) Field of Classification Search
None
See application file for complete search history.

(56) References Cited

U.S. PATENT DOCUMENTS

| | | | | |
|---|---|---|---|---|
| 11,562,004 | B2* | 1/2023 | Ferreira, Jr. | G06F 16/9536 |
| 2010/0121857 | A1* | 5/2010 | Elmore | G06F 16/2358 |
| | | | | 707/748 |
| 2012/0102050 | A1* | 4/2012 | Button | G06N 5/043 |
| | | | | 707/E17.014 |
| 2013/0006765 | A1* | 1/2013 | Lee | G06Q 30/0255 |
| | | | | 707/769 |
| 2015/0347952 | A1* | 12/2015 | Guan | G06Q 10/06393 |
| | | | | 705/7.39 |
| 2016/0132905 | A1* | 5/2016 | Richards | G06F 16/338 |
| | | | | 705/7.29 |
| 2016/0147864 | A1* | 5/2016 | Kane | G06Q 30/0206 |
| | | | | 707/723 |
| 2016/0189198 | A1* | 6/2016 | Mckenzie | G06Q 30/0277 |
| | | | | 705/14.41 |
| 2017/0083621 | A1* | 3/2017 | Bugaychenko | H04L 67/306 |
| 2017/0330209 | A1* | 11/2017 | McGilliard | G06F 16/9535 |
| 2017/0372252 | A1* | 12/2017 | Arora | G06Q 10/063112 |
| 2018/0285933 | A1* | 10/2018 | Lee-Chan | G06Q 30/0269 |
| 2019/0066730 | A1* | 2/2019 | Singh | G06F 16/78 |
| 2019/0130039 | A1* | 5/2019 | Fang | G06F 16/9535 |
| 2019/0236106 | A1* | 8/2019 | Zhang | G06N 20/00 |
| 2020/0151752 | A1* | 5/2020 | Kazlou | G06Q 30/0282 |

(Continued)

*Primary Examiner* — Sanjiv Shah
*Assistant Examiner* — Navneet Gmahl
(74) *Attorney, Agent, or Firm* — FIG. 1 Patents

(57) ABSTRACT

An adaptive collaboration platform is described. In accordance with the described techniques, a request is received to generate collaboration recommendations for an artist. A collaboration system processes artist data for the artist with additional artist data for other artists in an artist population to generate collaboration recommendations for the artist. The collaboration recommendations are exposed to the artist via a user interface of the collaboration system. The collaboration recommendations recommend at least one of the other artists as a collaborator for the artist. The user interface of the collaboration system also enables the artist to form a communication channel with the collaborator.

20 Claims, 13 Drawing Sheets

(56) References Cited

U.S. PATENT DOCUMENTS

| | | | | |
|---|---|---|---|---|
| 2020/0402014 | A1* | 12/2020 | Jena | G06N 5/046 |
| 2021/0026897 | A1* | 1/2021 | Rathje | G06F 16/90332 |
| 2021/0133266 | A1* | 5/2021 | Zhang | G06N 20/00 |
| 2021/0150604 | A1* | 5/2021 | Ghorbani | G06Q 30/0627 |
| 2021/0224661 | A1* | 7/2021 | Blackwood | G06F 16/951 |
| 2022/0019922 | A1* | 1/2022 | Mehrotra | G06N 3/006 |
| 2022/0067112 | A1* | 3/2022 | Penny | G06F 16/9538 |
| 2022/0383258 | A1* | 12/2022 | Stewart | G10H 1/0008 |
| 2023/0134076 | A1* | 5/2023 | Komich | G06F 16/735 706/12 |

* cited by examiner

ADAPTIVE COLLABORATION RECOMMENDATION PLATFORM

RELATED APPLICATIONS

This application claims priority under 35 U.S.C. § 119(e) to U.S. Provisional Patent Application No. 63/405,386, filed Sep. 9, 2022, and titled "Adaptive Collaboration Recommendation Platform," the entire disclosure of which is hereby incorporated by reference.

TECHNICAL FIELD

Media content platforms can be implemented as dedicated applications as well as web pages and enable entities (e.g., artists) to upload media content (e.g., music or videos) for subsequent streaming by other entities (e.g., users who visit and/or subscribe to the media content platform). Data associated with the entities that utilize the media content platform as well as engagement by such entities on the media content platform can be monitored and stored.

DETAILED DESCRIPTION

Figure 1:
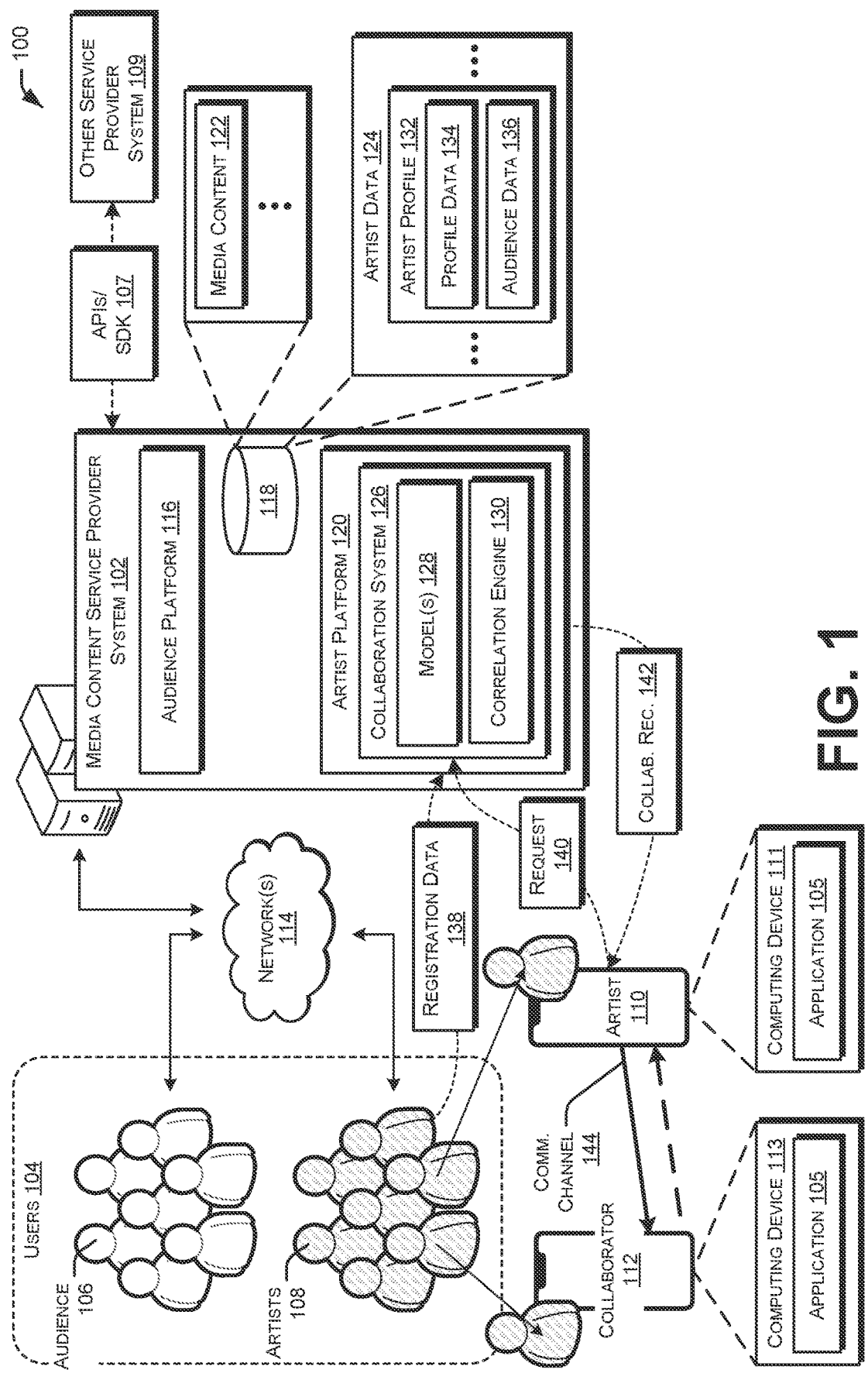
FIG. 1 is a block diagram of a non-limiting example environment for creating collaborative channels between entities, according to an embodiment described herein.

Disclosed methods and systems include a platform for one or more entities, e.g., artists, to facilitate collaboration on, creation of, and sharing of, one or more shared media outputs, such as media items in one or more formats configured for a specific media application or platform. In one or more implementations, the platform includes components that facilitate collaboration in a manner that is adaptive or dynamic as, for example, with respect to contextual attributes. For example, the platform includes components to identify two or more entities to recommend collaboration on a shared media output. The platform may utilize machine-learning to identify the two or more entities in a manner that uses contextual attributes to match entities, where examples of such contextual attributes include social media status and/or behavior, locations of the entities, and media item profiles (e.g., musical similarity or musical dissimilarity), to name a few.

The platform includes components that can then further filter identified entities based on the contextual attributes, such as based on collaboration objectives specified by either of the entities identified as a match for a collaboration together. Examples of such specified collaboration objectives include preferences for characteristics of the collaborator or the collaborator's media content and/or desired characteristics in the shared media output to be produced through the collaboration. The platform includes components to present (e.g., display) identified and filtered entities as collaboration recommendations via a user interface, e.g., of a computer application of the platform.

The platform further includes components that create, based on the contextual attributes, either a one-directional or bi-directional communication path or channel for the entities to share select information, e.g., for the purpose of collaboration. By creating such communication paths or channels, the platform provides the identification of collaborators and formation of collaborations to a centralized platform. Due to this, the platform is able to digitally facilitate and monitor a variety of interactions (e.g., between matched entities as well as unmatched entities) over the lifetimes of numerous collaborations. Tracking interactions over time enables the platform to expose data-driven recommendations and communication opportunities that are customized and time relevant. Additionally, tracking interactions over time enables the platform to change recommendations dynamically as an entity's context changes, as evidenced by a change in any of the multitude of contextual attributes pertinent to the entity. The platform further includes components that organize and surface the relevant communication channels and communications, e.g., based on contextual attributes.

As used herein, the term "collaboration" or "networking" can be used to describe any matching or partnership between two or more entities to produce a shared media output. Entities may act in a variety of different roles, including but not limited to an artist, vocalist, instrumentalist, songwriter, and so forth. Producing a shared media output may involve integrating respective media items or merging a non-vocal media item provided by one entity and a vocal media item by another, blending a variety of media to create a single media item, and so on. In one or more implementations, a shared media output is a media item (or combination of media items), including, for example, a song, video, project, podcast, blog, tour, or merchandise. The term "contextual attributes" can include social media status and/or behavior, genre, location, artist preferences, device capabilities, network capabilities (such as bandwidth), media item profile (e.g., musical similarity or dissimilarity, instrumental similarity or dissimilarity, and so on), and similarities and/or dissimilarities between entities, to name a few examples.

Content matching (e.g., between artists) and subsequent collaborations are typically accomplished on an ad-hoc basis or through standard queries on past data alone. For example, if artists have collaborated in the past, the artists tend to collaborate with the same artists in the future or even like artists.

Further, collaborations are often a source of creative energy for the collaborators to produce an inspired output, while also appealing to each involved artist's audience thereby targeting specific or desired metrics, e.g., increase in reach and ultimate success of the collaborative output for each individual artist involved in the collaboration, or royalty per stream. While collaborations historically have been between artists within the same genre (e.g. two country or two hip-hop artists partnering), more recently artists have started to shift towards creating genre-crossing collaborations, e.g., a song featuring a country artist and a hip-hop artist.

As mentioned above, it is difficult for artists to identify and surface other artists to generate shared media output using conventional techniques. Artists who want to collaborate with other artists find it difficult, time-consuming, and imprecise to determine who the right collaborators might be to accomplish varying goals and metrics. For example, some artists want to collaborate with another artist to increase the size of the artist's audience, while other artists want to collaborate to engage the artist's existing audience. There are simply no existing data-driven ways for an artist to achieve dynamically changing collaboration objectives, such as to ascertain whether the artist's audience overlaps with a collaborating artist and/or whether there is a potential to modify the artist's audience by producing a collaboration.

To that end, the methods and systems described herein provide a platform to build new and unique connections (including or besides connections between the artists that have collaborated in the past) between entities based on contextual attributes, such as based on genre, desired instrumentality, specified collaboration objectives, and ever-changing audience (e.g., listener) data. As discussed herein, the platform includes components to dynamically generate and surface data-driven collaboration recommendations for an artist, among other functionalities to support collaboration. Examples of recommendations include, but are not limited to, which artist(s) to engage with, which communication channel(s) to leverage, and how to modify communications to better adapt to meet collaboration objectives (e.g., engagement metrics).

Another problem faced is that even if an artist is identified for a potential collaboration, the process of establishing communication channels between artists is similarly time-consuming, especially for independent artists. Even once the artist decides to directly reach out, it is often difficult to determine a relevant communication channel to use (e.g., channel at which the receiving artist is most likely to respond), which causes artists to try multiple channels, many of which are not designed for networking. This results in wasted communications using channels that are left unresponded to, causing such electronic messages to get lost amongst thousands of unread messages received by artists over public platforms, and burdening storage resources which maintain such electronic messages while those messages can be largely ignored.

The described collaboration platform further includes components to enable an artist to form a direct communication channel with prospective collaborators within the platform and/or to direct potential collaborators to other channels and mediums, e.g., to direct collaborators to a third-party e-commerce platform or lending platform, a "real" phone number for calling or texting, and so on. In one or more implementations, the platform establishes a direct communication channel between artists that are recommended as collaborators based, in part, on contextual attributes, such as specified preferences for communication of two matched artists, observed communication behaviors of the two artists, observed communication behaviors of artists that produce a collaboration, observed communication behaviors of artists that do not produce a collaboration, and so on.

Another problem with traditional channels of communication between artists is that the platforms which enable communications are not tailored to identify collaborators for shared media outputs or to facilitate communications for such collaboration. Various social media platforms, for instance, are instead designed, in part, to engage users with content and gamification, e.g., involving various interactive elements of user interfaces, to keep users actively on the platform. Due to this, the underlying models of such social media platforms generate recommendations that are optimized to boost or prompt continued engagement with the platform. Thus, with traditional channels artists bear the burden of sorting through and analyzing numerous digital media content items, such as profiles, posts, videos, and the like, to identify and/or to filter such content in an effort to potentially identify a relevant collaborator. Moreover, this process has little if any connection to actual audience data and/or the actual collaboration-related preferences of potential collaborators.

In contrast, the described platform includes components that generate recommendations specifically for the purpose of facilitating collaborations. This includes arranging collaboration recommendations in user interfaces in a way that is relevant to an artist seeking collaboration, such as based on contextual attributes of the artist, including for instance based on collaboration objectives specified by the artist via interactive elements of the platform's user interfaces. Based on contextual attributes and/or collaboration objectives, for instance, the platform exposes potential collaborators that best match a collaboration request in a more prominent position within a user interface and/or with an indication of how well the potential collaborators match relative to one another. Further, the platform includes components for surfacing communications in a manner that is time relevant and that is based on machine learning trained to optimize the surfacing of communications to achieve collaboration objectives.

In one or more implementations, a dedicated application or portal (e.g., web page) configured for the collaboration platform receives a request to generate collaboration recommendations for an artist, e.g., recommendations for networking or collaboration on one more media items, creative objects, and so on. The request can be received when the artist joins the adaptive collaboration platform, e.g., through a dedicated resource identifier, such as URL, or interactive element, or responsive to a specific request from the artist to identify collaborators. In some cases, an artist can include specific collaboration objectives with the request, defining the types of collaborators the artist is seeking, such as collaborators that are predicted to grow the artist's audience, specific and/or desired metrics achieved as a result of a collaboration (e.g., number of streams and/or views, level of predicted critical acclaim, generation of a "new sound", generation of a sound similar to an already-generated and popular sound), collaborators that are predicted to engage the artist's existing audience, collaborators associated with a specific genre, and so forth.

In one embodiment, the adaptive collaboration platform processes entity data, e.g., for the artist, with additional artist data for other artists in an artist population in order to generate collaboration recommendations for the artist. As noted above, although the techniques discussed herein are largely described in relation to "artists," the techniques may be applicable to other entities, such as to facilitate collaborations between various types of entities and/or collaborations between artists for those different types of entities. Examples of those other entities include but are not limited to producers, labels, actors and actresses, athletes, crafts people, personalities, business people, academics, fitness personalities, merchandisers, chefs, restauranteurs, facility or venue owners/managers, fashion designers, influencers, models, podcast hosts and/or guests, and promoters, to name just a few. Accordingly, the adaptive platform may process data associated with those other entities.

In the context of artists, though, the artist data may include both profile data of the artist as well as audience data (such as listener data) of the artist. Broadly, the profile data represents data specified by a respective artist (or a manager of the artist), e.g., as part of setting up or subsequently modifying the artist profile. Examples of such information include, but are not limited to, artist name(s), title, genre, style, description, biography, geography, images, videos, sample media content (e.g., music), status, profile theme (e.g., colors), merchandise offered, territory, and so forth. Alternatively or additionally, the profile data may be attributed to the respective artist automatically. Examples of the profile data that may be attributed to an artist profile automatically include, but are not limited to, a status of the artist (e.g., as a "famous" person or unlocked based on various performance measures), awards won by the artist, and so on. In one or more implementations, the profile data automatically attributed may also include one or more of artist name(s), title, genre, style, description, biography, geography, images, videos, sample media content (e.g., music), status, profile theme (e.g., colors), merchandise offered, territory, and so forth.

The audience data describes users and/or one or more aspects of the users that consume media content associated with the artist. In accordance with the described techniques, the users that consume the media content associated with the artist may be considered the audience of the respective artist. In the context of music, the audience data may correspond to "listener data." In one or more implementations, the audience data describes demographics of the audience that consumes media content associated with the artist profile. Examples of such demographics include, but are not limited to, age, location (e.g., current, residence, birth, etc.), annual income, purchase history, specified preferences (e.g., for music genres), determined preferences (e.g., based on monitoring actual listening behavior), social media behavior, gender, sexual orientation, and so on. Alternatively or in addition, the audience data describes consumption of the media content associated with the artist profile. As governed by data privacy models, a user's explicit permission for data use may be requested to enable these features.

The adaptive collaboration platform leverages one or more models trained using machine learning to generate the collaboration recommendations for the artist. In one or more implementations, the models are trained using a training set that includes both acceptable and unacceptable (e.g., based on a predefined threshold) collaboration recommendations. The models can be trained to optimize for different performance metrics (e.g., collaboration objectives), such as to select collaborators to grow an artist's audience (e.g., based on dissimilar collaborators) and/or to engage the artist's current audience (e.g., based on similar collaborators). As part of generating the collaboration recommendations, the one or more models process the artist data and the artist data associated with other artists to generate relevancy scores which predict how relevant each respective artist in the artist population would be as a collaborator with the artist. In one or more implementations, for example, the artist data includes audience data for the artist's audience, and the relevancy scores are based at least in part on the amount of overlap between the artist's audience and the respective audiences of the other artists in the artist population. Alternately or additionally, the relevancy scores are based at least in part on a potential for growth of the artist's audience to include users of respective audiences of the other artists in the artist population.

A subset of the artists in the artist population may then be surfaced to the artist based on the relevancy scores, e.g., by selecting the artists with the highest relevancy scores to surface as potential collaborators to the artist. These recommendations are surfaced through a user interface of the adaptive collaboration platform which enables the artist to view and interact with potential collaborators. The user interface may also enable the artist to form a communication channel with the recommended collaborators, e.g., by enabling the artist to send an electronic message directly to the recommended collaborators. In some cases, a collaborator may be recommended to the artist, but the artist is not necessarily recommended to the collaborator. In these cases, however, once the artist communicates with the collaborator via the adaptive collaboration platform, the collaborator is then able to communicate back to the artist.

In one or more implementations, after a collaboration is produced (e.g., between two or more of the artists), the described system facilitates distribution and/or promotion of the collaboration. By way of example, the system may generate and provide recommendations regarding where (e.g., channels or medium) to place the collaboration (e.g., a media item). For instance, the system may provide one or more functionalities for producing and/or delivering a promotional video, recommending a platform on which to deliver (e.g., via television, streaming application, social networking platform, mobile applications, etc.), provide connections to labels (e.g., based on data describing which labels and producers to contact to enable hosting the content because those entities may have permissions), creating a smart contract to enable one or more of the distribution and/or promotion, and so on.

The described techniques solve problems faced by conventional systems by decreasing the time and manual input required by artists to locate other artists who are potential candidates for collaboration. Moreover, providing a dedicated communication channel as part of the adaptive collaboration platform ensures that messages can be directly communicated to potential collaborators, while reducing the wasted electronic messages communicated over networks of conventional systems. Moreover, the adaptive collaboration platform reduces an amount of storage used to store such communications, by maintaining the communications in a centralized platform rather than across different email platforms and/or cellular carriers.

Even if types of communication are limited, many conventional systems via which users connect electronically (e.g., social networking platforms) allow communication channels to be established between most users, such as between users that are fans and users that are artists (or celebrities). For example, many systems allow users that are fans to request connections to artists via those systems. This problem is unique to the digital world because users (e.g., artists) do want associated profiles surfaced to other users via the systems, but users do not want to interact with all other users in all the ways that are available via such systems, e.g., direct messages, video chat, becoming "friends" or "connections," and so forth. This is similarly true among the population of users that are artists. A user that is an artist, such as a more popular or famous artist, may receive a great many requests from other artists via one or more systems (e.g., social networking platforms) to connect or collaborate. However, the number of requests a popular artist receives may be so numerous that it is difficult for the popular artist to identify which requests are actually of interest and which are spam or malicious, if the popular artist is even willing to entertain requests for connections and/or collaborations—some popular artists may not be.

Rather than allowing users that have already been filtered at least once, through registration (or onboarding) as actual artists, to connect with any other artist, the described techniques further filter options for artists to connect with other artists for initiating more selective collaborations. In particular, the described techniques enable an artist to specify collaboration objectives that are then used by the system to provide more customized collaboration recommendations. For example, the described techniques enable an artist to specify via a user interface one or more collaboration objectives, such as relating to characteristics the artist is seeking in a collaborator and/or characteristics of the shared media output (e.g., media content item) that is to be produced in connection with the collaboration.

Examples of such collaboration objectives include, but are not limited to, that the artist is seeking collaboration with another artist from a particular genre or territory, that the artist is seeking vocals for the shared media output, that the artist is seeking instrumentals (e.g., specifying particular types such as drums, piano, strings, brass, guitar, etc.) for the shared media output, that the artist is seeking music for the shared media output, that the artist is seeking visual media content (e.g., video) for the shared media output, and so on.

In this way, artists are surfaced a curated set of collaborators that is filtered for the artists, which reduces the number of communications artists are exposed to with the described system and increases the number of quality communications. By filtering recommendations so that communications occur between recommended collaborators, the system reduces network traffic and also storage of unwanted communications and/or storage of communications that an artist may not respond to, e.g., due to being overwhelmed by the number of communications received with conventional techniques. By filtering the artists allowed to utilize the system, the system also reduces the number of communications received from fraudulent users, thereby improving digital security of artists' personal information and security of those artists' computing devices.

Although the techniques discussed herein are described in relation to "artists," the techniques are applicable to other entities, such as to facilitate collaborations between various types of entities and/or collaborations between artists for those different types of entities. Example entities for which the described collaboration system may be useful include but are not limited to artists, producers, labels, actors and actresses, athletes, crafts people, personalities, business people, academics, fitness personalities, merchandisers, chefs, restauranteurs, facility or venue owners/managers, fashion designers, influencers, models, podcast hosts and/or guests, and promoters, to name just a few.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of the figures and claims.

FIG. 1 is a block diagram of a non-limiting example environment 100 for creating collaborative channels between entities. In one embodiment, the environment 100 includes a media content service provider system 102 and a population of users 104 of the media content service provider system 102. In one or more implementations, the media content service provider system 102 is a music service provider system that, at least in part, provides media items (e.g., by streaming media such as by streaming music or streaming video) to an audience 106 of at least one of the users 104. In one or more implementations, for instance, the media content service provider system 102 is, or includes, an application 105, e.g., a subscription-based digital media streaming application, which executes on a computing device (e.g., a mobile phone or other computing device) with media items stored on a remote server, such as on a server implementing and/or associated with the media content service provider system 102. In this way, the media items are either streamed offline (cached on the local computing device) or streamed online with content streaming in packets. Hence, the media content service provider system 102 may be a digital audio streaming service (e.g., for music and/or podcasts), a digital video streaming service, or a streaming service that provides streaming of various different types of digital media or multimedia. Such a streaming service may be subscription-based, so as to allow the users 104 to stream digital media items (e.g., songs, podcasts and/or videos) on-demand from a centralized library provided by the media content service provider system 102.

Additionally or alternatively, the application 105 of the media content service provider system 102 is a collaboration application and/or provides access to collaboration functionality for qualified users as described herein along with providing subscription-based digital media streaming. In one or more implementations, the collaboration application is communicatively coupled, e.g., through dedicated application programming interfaces (APIs) and/or software development kits (SDKs) 107 (for the purpose of brevity these layers may be referred to subsequently as "APIs/SDKs 107") to at least one other service provider system 109 that is or deploys one or more application(s), such as a streaming application, lending application, payment application, appointment application, loyalty application, and so on. The users 104 access the media content service provider system 102 via one or more computing devices, which execute the application 105 as described herein. In at least one implementation, the users 104 have user accounts with the media content service provider system 102, although in at least some cases, one or more of the users 104 have not signed up for user accounts with the media content service provider system 102. In at least some cases, where one or more of the users 104 have not signed up for user accounts ("unregistered users") with the media content service provider system 102, such unregistered users can interact with registered users through provisional or time access. In a scenario where a registered user 104 (e.g., a user having an account with the media content service provider system 102) accepts a collaboration recommendation that corresponds to an unregistered user, the unregistered user can interact with the registered user on a third-party platform, such as the at least one other service provider system 109 and/or a messaging platform communicatively coupled to the media content service provider system 102.

In accordance with the described techniques, one or more of the users 104 are designated by the media content service provider system 102 as "artists" forming a population of users that are artists 108. In one or more implementations, the media content service provider system 102 provides the "artist" designation to users that have provided digital evidence that those users generate media content for the media content service provider system 102, for other service providers, for live performances, and/or for exposure to an audience in various ways. In one or more implementations, the media content service provider system 102 activates the "artist" designation for a user 104 by updating data (e.g., one or more fields) in user data maintained by the media content service provider system 102 in association with the user 104. The illustrated example depicts an artist 110 and a collaborator 112, which are both users 104 of the media content service provider system 102 and which are both included in the population of artists 108.

The artist 110 and the collaborator 112 are depicted with respective computing devices, which represents how the artist 110, the collaborator 112, and other users access the functionality of the media content service provider system 102. In particular, the artist 110 is depicted with computing device 111 and the collaborator 112 is depicted with computing device 113. The computing device 111 and the computing device 113 are both depicted including the application 105. By enabling user interaction with various user interfaces of the application 105, the computing device 111 and the computing device 113 provide the artist 110 and the collaborator 112, respectively, with access to the various functionalities of the media content service provider system 102. Without the computing device 111 and the computing device 113, the data-driven collaboration recommendations provided by the media content service provider system 102, in accordance with the described techniques, are inaccessible to the artist 110 and the collaborator 112. This is in part because the described techniques derive contexts of the artist 110 and the collaborator 112 via information specified through interaction with user interfaces and via information automatically (e.g., without user input) pulled from the computing devices (e.g., using one or more APIs), such as location information, listener data, and so on.

It is to be appreciated that one or more users 104 in the population of artists 108 may also be included in the audience 106, e.g., because those artists 108 consume media content produced by other artists 108 and/or because those artists consume media content provided via the media content service provider system 102 or the at least one other service provider system 109. The users 104 (the computing devices associated with the users) are connected to one or more other users 104 (the computing devices associated with the other users) and to the media content service provider system 102 via one or more network(s) 114, an example of which is the Internet.

Computing devices that implement the environment 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described in relation to FIG. 12.

The media content service provider system 102 is depicted including audience platform 116, storage 118, and artist platform 120. The storage 118 is depicted storing media content 122 and artist data 124. The storage 118 may be configured in various ways to store data. For instance, the storage 118 may include or otherwise have access to one or more databases, virtual storage, and so forth. Alternatively or in addition, the storage 118 includes one or more data tables, data stores, and so on, that may be physically or logically separated (e.g., physically remote from one another and/or partitioned to store different data). The artist platform 120 is depicted including a collaboration system 126 having one or more model(s) 128 and correlation engine 130.

In one or more implementations, individual artists of the population of artists 108 have an artist profile 132 in the artist data 124. The artist data 124 is depicted with ellipses to indicate that the artist data 124 includes multiple artist profiles 132, e.g., an artist profile for individual artists of the population of the artists 108. Alternatively or additionally, a group of multiple artists or team members, e.g., a band, may correspond to a single artist profile 132, such that each artist of the group, or team member, is credentialed by the artist platform 120 to the respective artist profile 132 or a portion of the respective artist profile 132. In one or more implementations, the collaboration system 126 allows each member of the band or the team (or one or more selected, permissioned members) to edit the artist data of the artist profile 132, including, for example, collaboration objectives for generating collaboration recommendations for the artist 110. Accordingly, in one or more implementations, the collaboration system 126 provides one or more user interface instrumentalities which enable an artist 110 to assign permissions to one or more members of the artist 110's band or team to edit profile information associated with determining collaborators. As discussed below, access to an artist profile 132 by each of multiple artists in a group or members of a team may be controlled by an access control system (not shown). In the illustrated example, the artist profile 132 is depicted including profile data 134 and audience data 136, however, the artist profile 132 may include different data without departing from the spirit or scope of the described techniques.

Broadly, the profile data 134 represents data specified by a respective artist (or by a manager or other associate of the artist having access to the artist profile 132 on the media content service provider system 102), e.g., as part of setting up or subsequently modifying the artist profile 132. Examples of such information include, but are not limited to, artist name(s), title, genre, style, description, biography, images, videos, sample media content (e.g., music), status, profile theme (e.g., colors), equipment and/or instruments associated with the artist (e.g., vocals, guitar, drums, flute, violin, compressed air machine, laser machine, DJ controller type or functional capabilities, preferred mixing software, etc.), and so forth. Alternatively or additionally, the profile data 134 may be attributed to the respective artist, such as automatically by the media content service provider system 102. Examples of the profile data 134 that may be attributed to the artist profile 132 by the media content service provider system 102 (or other sources) include, but are not limited to, a status of the artist (e.g., as a "famous" person or unlocked based on various performance measures), awards won by the artist, and so on. In one or more implementations, the media content service provider system 102 may also automatically determine and populate the profile data 134 with one or more of artist name(s), title, genre, style, description, biography, images, videos, sample media content (e.g., music), status, profile theme (e.g., colors), and so forth. In such implementations, the media content service provider system 102 may determine such information automatically (e.g., based on scraping one or more other sources about the artist), populate an initial profile with the information, and allow a user to provide user input (via a computing device) to update at least some of the profile data 134.

The audience data 136 describes the users 104, or one or more aspects of those users, that consume the media content 122 associated with the artist profile 132. In accordance with the described techniques, the users that consume the media content associated with the artist profile 132 may be considered the audience 106 of the respective artist. In the context of music, the audience data 136 may correspond to "listener data." In one or more implementations, the model(s) 128 leverage an underlying social graph to generate collaboration recommendations, such as a social graph that the collaboration system 126 generates from the audience data 136. By way of example, the collaboration system 126 generates a social graph that includes nodes that represent users, e.g., including nodes that represent listeners and/or nodes that represent artists. Further, the social graph includes edges that connect the nodes of users that are listeners to the nodes of users that are artists, whose music the listeners have listened to as or with whom the listeners have digitally interacted in some other way as indicated by the audience data 136. In one or more implementations, the edges are weighted, such as based on a number of listens, amount of listening, amount of digital interaction (e.g., likes and/or comments), shares, etc. Thus, the node of a listener is connected to numerous nodes of artists to which the listener listens, and the node of an artist is connected to numerous nodes of listeners that have listened to the artist's music or otherwise interacted with the artist.

In one or more implementations, the audience data 136 describes demographics of the audience 106 that consumes media content associated with the artist profile 132. Examples of demographics include, but are not limited to, age, location (e.g., current, residence, birth, etc.), annual income, purchase history, specified preferences (e.g., for music genres), determined preferences (e.g., based on monitoring actual listening behavior), social media behavior, gender, sexual orientation, and so on. Alternatively or in addition, the audience data 136 describes consumption of the media content associated with the artist profile 132. Likewise, audience data 136 for different artist profiles 132 describes consumption of the media content associated with those other artist profiles 132. Accordingly, the audience data 136 may also describe a number times a piece of media content is consumed (e.g., listened to) by an individual user 104 of the audience or by the entire audience 106 or by one or more segments of the audience for a period of time (e.g., all time, last year, last month, last week, yesterday, today, and so on), a frequency at which the piece of media content is consumed (e.g., per user, per segment of the audience 106, how it changes over time, etc.), a relative popularity of the artist among a segment of the audience 106, and so forth.

In one or more implementations, in order for a user 104 to become designated as an artist 108 with the media content service provider system 102, the user onboards or "registers" with the media content service provider system 102. To register to become an artist 108, for instance, a user may provide registration data 138 to the media content service provider system 102. The media content service provider system 102 may limit which of the users 104 are qualified to be designated as artists 108 based on the registration data 138. In one or more instances, for example, the media content service provider system 102 may deny a user 104 permission to access the artist platform 120 based on the registration data 138 and, as a result of such denial, the media content service provider system 102 may not designate the user 104 status as an artist 108.

In one or more implementations, the media content service provider system 102 includes an access control system (not shown) to ensure identity verification with respect to the user, and confirm that a user 104 registering to become an artist 108 "is who they say they are," which may include provision of various information such as social media accounts, email addresses, personally identifying information, biometric information, and so forth. If, based on the review of the registration data 138, the access control system determines that user 104 is "who they say they are" the media content service provider system 102 may allow the user to be designated as an artist 108. In short, for example, the media content service provider system 102 may allow the user 104 to be designated as an artist 108 as long as the user 104 meets one or more acceptance criteria, e.g., based on artist preferences and permissions to be included in the collaboration platform, based on likelihood that an artist may be interested in collaboration (such as above 50% likelihood), based on a likelihood that another artist 108 will be interested in collaborating with the artist, and so on. In one or more implementations, the media content service provider system 102 may also implement various criteria to limit the population of artists 108 to actual artists, such as by requesting users to provide one or more samples of media content the users have produced or performed, one or more reviews, and so forth.

The media content service provider system 102 may thus grant a user 104 that meets the criteria for becoming an artist 108 permission to access functionality of the artist platform 120 or permission to access a portion of functionality of the artist platform 120. For instance, lesser-known artists may be granted permission to access a subset of the total functionalities of the artist platform 120, whereas more well-known artists are granted permission to access all of the total functionalities or a subset with more of the total functionalities. Alternatively or in addition, some functionality may be withheld from an artist 108 until the artist satisfies some threshold, at which point a larger number of the functionalities are "unlocked" for the artist. The locking and unlocking of functionalities translates into making parts of those functionalities visible or invisible (or visible but with a locked status and indicating specific steps that the artist needs to take to unlock) via a graphical user interface of the media content service provider system 102 or the at least one other service provider system 109. In one or more implementations, there may be tiers of functionality to unlock at varying thresholds. For example, if the artist collaborates with more than a threshold number of artists (e.g., 10 artists) in a threshold period of time (e.g., a year), the artist can then collaborate with a wider range of artists, in more distinct genres as an example. The functionalities made available and/or exposed to an artist (e.g., visible and locked) can also be modified based on the dynamic nature or artist's listener data, where functionalities are added and/or removed on a periodic basis. In some implementations, an artist 108 can provide specific data, such as identity verification data, concert date and/or ticket information, performance videos, and so on, to further unlock functionality or even access the artist platform 120.

However, if based on review of the registration data 138, the access control system determines that the user 104 is not "who they say they are" the media content service provider system 102 may deny the user designation as an artist 108. Moreover, in one or more implementations, the media content service provider system 102 may also include functionality to notify the actual artist or person that an imposter is attempting to register as the actual artist or person on the artist platform 120. This can prevent fraud, intellectual property infringement (or theft), security vulnerabilities, and so on. Manners in which the media content service provider system 102 may inform the actual artist or person include, but are not limited to, email, phone, social media messaging, text, and so forth. In the context of functionality of the artist platform 120 that is made available to one or more of the artists 108, consider the following discussion of the collaboration system 126.

In the illustrated example, the collaboration system 126 is depicted receiving a request 140 from the artist 110, e.g., to collaborate or network or otherwise engage with one or more other artists 108. In one or more implementations, the artist 110 may select or otherwise interact with an interactive element of a user interface (e.g., a button or voice command) of the artist platform 120 to submit a request 140 for the collaboration system 126 to recommend one or more collaborators. Alternatively or in addition, the request 140 may be responsive to the artist 110 navigating to a home page, home screen, create page or screen, connect page or screen, perform page or screen, or user interface corresponding to the artist platform 120. Alternatively or in addition, the collaboration system 126 may process the artist data 124 and/or the media content 122 and, based on the processing, generate the request 140 automatically (e.g., without input from the artist 110), such as based on the data indicating satisfaction of one or more thresholds. Examples of such thresholds include an amount of time without interacting with the platform, a number of collaborations recommended to other artists for the artist 110, a threshold amount of consumption of the artist 110's media content (e.g., above or below the threshold), a prediction that collaboration with one or more other artists 110 will likely result in a metric (e.g., number of streams) that satisfies a threshold, and so forth. The request 140 may be communicated to the artist platform 120 from the artist 110 or generated automatically responsive to a variety of triggers without departing from the spirit or scope of the described techniques.

The collaboration system 126 may surface a notification to a device of the artist 110 without receiving an explicit request to collaborate in a variety of other instances as well, such as if a matched collaborator is holding an event (e.g., a concert) within a threshold distance (e.g., 20 miles) of a current location of the artist 110 (e.g., based on GPS data received from a device associated with the artist). Other events may trigger the collaboration system 126 to deliver a notification to the device of the artist 110, such as a "match score" between the artist 110 and a collaborator 112 being above a threshold score, where the match score may correspond to one or more of a popularity of the collaborator, a genre of the collaborator (whether the same or different from the artist 110), a likelihood of the collaborator to collaborate with other artists, and so on. The collaboration system 126 may provide a notification recommending a collaboration in a web browser or an application associated with the collaboration system 126 executing on the device of the artist 110, as a push notification, and so forth. The collaboration system 126 may provide a notification recommending a collaboration in other ways without departing from the spirit or scope of the described techniques, such as via an automated voice message, a text message, an email, and so forth.

In one or more implementations, the collaboration system parses the request 140, such as by using the correlation engine 130. By way of example, the correlation engine 130 parses the request 140 using natural language processing, and/or other contextual attributes, such as location, genre, and projects and/or recent media content output of artists or sellers similar to this artist. The correlation engine 130 may then determine a context-based artist fingerprint that corresponds to the request 140 and/or underlying data associated with the request, such as artist data, listener data, audio, and video data. In one or more implementations, this underlying data is obtained through a capture device. This artist fingerprint is then compared with one or more fingerprints of other artists in a database to identify a match, e.g., at the time when the artist fingerprint is taken. Matches need not be exact in various implementations, due to differences in levels, extraneous noise, imprecise or uncorrelated start times, etc., but may be considered to be matching if the two artist fingerprints correspond above a threshold. In other implementations, the correlation engine 130 may compare the received artist fingerprint to fingerprints of other artists over a prior period, such as a five-minute period. The correlation engine 130 may use any type of analysis to compare fingerprints, including principle component analysis (PCA), Latent Dirichlet allocation (LDA), or any other such statistical analysis methods. In some implementations, the correlation engine 130 may generate match scores for the match of an artist fingerprint to other fingerprints of artists in the database, and identify as matching an artist fingerprint with a highest match score. In a further implementation, the correlation engine 130 may adapt match scores based on historical data associated with a client device of the artist 110, such as based on communications happening on a communication channel or other actual previous collaborations between two or more artists. Examples of actual communications which may be described by historical data to determine a match include but are not limited to liking a post or responding to a message, sentiment(s) of one or more messages (e.g., positive, neutral, or negative) between artists using natural language processing, etc.

In some cases, the correlation engine 130 may source previous collaborations between two or more artists from credits (e.g., in metadata associated with a media content item) to identify common or shared collaborators. The correlation engine 130 may then use the identified common or shared collaborators to generate collaboration recommendations. For example, the correlation engine 130 may determine two or more artists that have been previously recommended to the artist 110 that are collaborating or have previously collaborated with one another, and use information related to such collaborations for recommendations to the artist 110. By presenting to the artist 110 examples of artists that have been recommended to one another and collaborated, the artist 110 may be encouraged to participate in collaborations by witnessing other artists' collaborative experiences.

Based on the request 140, the collaboration system 126 generates a collaboration recommendation 142 (also referred to in some figures as "collab. rec. 142"), which recommends at least one other artist of the population of artists 108 as a collaborator 112 for the artist 110. In one or more implementations, the collaboration system 126 determines which other artists 108 of the population to recommend by using the model(s) 128. In one or more implementations, the model(s) 128 include one or more machine learning models, examples of which include neural networks, natural language-based models, regression models, graph networks, convolutional neural networks, reinforcement learning models, classifiers, autoencoders, structured models, unstructured models, and so on. The model(s) 128 may be configured as, or include, other types of models without departing from the spirit or scope of the described techniques. These different models may be built or trained (or the models otherwise learned), respectively, using different data and different algorithms due, at least in part, to different architectures and/or learning paradigms.

Which of the model(s) 128 are used to generate the collaboration recommendation 142 may depend at least in part on the request 140. For example, the artist 110 may specify one or more characteristics for the request, such as reasons the artist would like to collaborate. For instance, the artist 110 may specify that a reason a collaborator is requested is for artistic purposes (e.g., explore a new sound, make a sound that has not been made, etc.), is to enter into a different genre or medium, to improve or satisfy a performance metric (e.g., number of listeners, number of streams, number of times song is used on a social media platform, popularity, amount of money on album or song sales, and so forth), is to connect with one or more particular other artists, and so forth. Certainly, the artist 110 may wish to collaborate for various reasons without departing from the spirit or scope of the described techniques, and the artist platform 120 may expose a user interface to the artist 110 which allows the artist 110 to specify one or more reasons or various factors for seeking a collaboration. For example, the user interface may allow a user to specify preferences for a collaborator (e.g., genre, layer of a music track to which a collaborator corresponds (vocals, instrumental), type of product to be produced and/or service provided by the collaborator) and/or desired characteristics of a shared media output produced through a collaboration. In some examples, the request 140 may include one or more natural language inputs indicating reason(s) that the artist 110 is looking to collaborate, and the model(s) 128 may be configured in such cases to parse and interpret the natural language input using natural language processing to match collaborators with one another, e.g., using "fuzzy matching." The model(s) 128 selected for use to generate the collaboration recommendation 142, from the available model(s) 128, may be based on the specified reasons, which may further be included in the request 140.

As input, the model(s) 128 may be configured to receive a variety of data to generate the collaboration recommendation 142. To this end, the model(s) 128 may also be trained using a variety of data. For example, the model(s) 128 may be configured to receive and trained using the media content 122. For example, the model(s) 128 may be trained based on sound characteristics. In this way, the model(s) 128 may be trained to determine sounds that are similar to input sounds (e.g., from music created by the artist 110), sounds that are complementary to music created by the artist 110, sounds that if combined with sounds of the artist 110 would yield sounds similar to popular sounds or would yield sounds that the audience 106 is predicted to like (e.g., sounds occurring on a weekly "Top 40" list, sounds popular in a specific genre on a music streaming platform), and so forth. In one implementation, an affinity engine (not shown) can be used to determine similarity to generate a list of similar users/members, albums, artists, songs, or genres, e.g., based on the user's ratings, preferences, play data, and/or explicit and/or implicit user behavior. Additionally, in one embodiment, an affinity calculation can create exclusion rules, e.g., ignore from the list the top N most popular artists (or albums, media files, genres) when calculating a similarity between two users, as overlap of these artists (or albums, media files, genres) may have less value in determining overall music-taste overlap. In the same vein, the affinity engine can create preference rules, e.g., to accept certain artists who engage and have been observed to convert into collaborations. The affinity engine, in one embodiment, can additionally or alternatively, approach affinity by highlighting the dissimilarities, e.g., instances where artists or genres have infrequently or have not yet collaborated, or where artists in disparate locations have infrequently or not yet collaborated.

With regard to dissimilarities, for instance, the affinity engine (not shown) can be used to determine dissimilarity to generate a list of dissimilar users/members, albums, artists, songs, or genres, e.g., based on the user's ratings, preferences, play data, and/or explicit and/or implicit user behavior. Additionally, in one embodiment, an affinity calculation can create exclusion rules, e.g., ignore from the list the top N most popular artists (or albums, media files, genres) when calculating a dissimilarity between two users. In the same vein, the affinity engine can create preference rules, e.g., to accept certain dissimilar artists who engage and have been observed to convert into collaborations.

In one or more implementations, the model(s) 128 may include one or more models configured to determine a next song to play for a user 104 and/or to generate a playlist of songs for a user 104, e.g., at a particular time. In such implementations, the model(s) 128 may generate the collaboration recommendation 142 based, in part, on at least one model configured to determine a next song or to generate a playlist. Given a song, playlist, name of the artist 110, and/or historical data (e.g., listener behavior), for instance, such a model may be configured to determine and then output a next song and provide the artist corresponding to the "next song" as the collaborator 112, e.g., as part of the collaboration recommendation 142. Additionally or alternatively, such a model may be configured to determine a playlist and output the determined playlist. Accordingly, one or more of the artists 108 having songs on the playlist may be recommended to the artist 110 in the collaboration recommendation 142.

Additionally or alternatively, during training of the model(s) 128, editorial matches may be used as a ground truth for the collaboration recommendation 142 provided by the model(s) 128, such that during training the outputs of the model(s) 128 are compared to the editorial matches. In one or more implementations, the editorial matches may include historical collaborators, collaborators recommended by "experts" in the artistic field (e.g., managers, label heads, producers, etc.). Such editorial matches may correspond to "acceptable" collaboration recommendations, e.g., the collaborations that have been popular on multimedia platforms and/or recommended by artistic experts. Thus, during training, the output of the model(s) 128 may be "rewarded" when the output corresponds to acceptable collaboration recommendations, such as by adjusting internal weights of the models to encourage such output and/or reinforce underlying policies (e.g., of a reinforcement model). The training may also use "unacceptable" collaboration recommendations during training. For example, when the output of the model(s) 128 corresponds to unacceptable collaboration recommendations during training, the model(s) 128 may be "penalized," such as by adjusting the internal weights to discourage such output and/or to penalize the underlying policies (e.g., of a reinforcement model). The training data comprising "unacceptable" collaboration recommendations may include pairs or groups of collaborators having collaborations that were unpopular on at least one multimedia platforms, pairs or groups of collaborators indicated as unacceptable by artistic experts, and so forth. In one or more implementations, the output of the model(s) 128 is compared during training to training data which comprises acceptable and unacceptable collaboration recommendations, where pairs or groups of collaborators in the training data may be labeled as such, e.g., "acceptable" or "unacceptable".

Alternatively or additionally, the model(s) 128 may be configured to be trained using the artist data 124, such as the artist profile 132 of the artist 110 and the artist profiles 132 of the other artists 108. This includes receiving as inputs the audience data 136 of the artist 110 and the audience data 136 of other artists 108. In one or more implementations, based on the input audience data 136, the model(s) 128 may be configured to predict which other artists 108 would be most relevant to the artist 110 in terms of optimizing a metric (e.g., number of streams) for overlapping portions of respective audiences 106. Alternatively or additionally, one or more of the model(s) 128 may be configured to predict which other artists 108 would be most relevant to the artist 110 in terms of optimizing a metric (e.g., number of streams) for a gap in the artists 110's audiences 106, such as a group or segment of the users 104 that are part of the audience of another artist 108 and are not part of the audience of the artist 110—a gap in the artist 110's audience 106 may indicate a potential for growth of the audience to add user's from another artist's audience. Additionally or alternatively, the model(s) 128 are trained or use as input a social graph, such as a social graph derived from the audience data 136.

In one or more implementations, relevancy scores output by the model(s) 128 correspond to a predicted likelihood that a collaboration between two or more artists (e.g., cross-genre) would produce some number of streams, downloads, views, etc. of the collaboration. In at least one variation, higher relevancy scores (e.g., 1, or closer to 1) indicate a prediction that the collaboration with the recommended collaborators will result in more streams, downloads, views etc., and lower relevancy scores (e.g., 0, or closer to 0) indicate a prediction that the collaboration with the recommended collaborators will result in fewer streams, downloads, views etc. In one or more implementations, the collaboration system 126 uses the model(s) 128 to generate a relevancy score for one or more of the artists 108 that have not prevented collaboration with the artist 110. For example, an artist 110 that is famous may provide selections to only collaborate with artists 108 that satisfy one or more threshold metrics (e.g., number of streams per month or popularity), thereby preventing artists 108 that do not satisfy the one or more threshold metrics from being recommended as collaborators to the artist 110. The one or more artists 108 recommended to the artist 110 as collaborators (e.g., the collaborator 112) may be further filtered. For example, the one or more artists 108 recommended to the artist 110 as collaborators may be filtered by selecting a number of top artists 108 (e.g., the top 3 artists based on relevancy scores, the top 5 artists based on relevancy scores, and so forth), by selecting artists 108 that satisfy a threshold relevancy, and so forth. Those artists 108 are then included in the collaboration recommendation 142 and surfaced to the artist 110, e.g., via a user interface.

In one or more implementations, a user interface of the collaboration system 126 enables the artist 110 to communicate with collaborators recommended in the collaboration recommendation 142. For example, the collaboration system 126 causes a communication channel 144 (also referred to in some figures as "comm. channel 144") to be formed from the artist 110 to the collaborator 112. In one or more implementations, this communication channel is initially unilateral and may allow for limited types of communication (e.g., liking content, posts, etc., of the collaborator 112). The illustrated example depicts a dashed line from the collaborator 112 to the artist 110 because the collaborator 112 may optionally establish a communication channel from the collaborator 112 to the artist 110. Indeed, in some scenarios, the collaborator 112 may not establish communication with the artist 110, e.g., the collaborator 112 may block or temporarily suspend communications with the artist 110 after receiving a communication over the communication channel 144. Alternatively or additionally, the collaboration system 126 may cause interactive elements to be output via a user interface that are operable (e.g., selectable) to establish a communication channel between artists that are both recommended by the system as collaborators to each other. Although an initial unilateral communication channel is discussed, in at least one variation, the communication channel established initially may be bilateral.

In one or more implementations, the collaboration system 126 may facilitate additional actions after forming the communication channel 144. Examples of such additional actions include booking a virtual space, booking a real-world space to perform or record the collaboration, scheduling a time and/or location (e.g., a venue) to perform the collaboration, providing the artist 110 and/or the collaborator 112 with access to lending (e.g., to purchase instruments for the collaboration), creating a dedicated store for the collaboration (e.g., to organize targeted giveaways or sell apparel or other merchandise associated with the collaboration, such as collaborative hoodies). As part of scheduling, the collaboration system 126 may surface a scheduling tool that enables the artist 110 and the collaborator 112 to find time to collaborate given the artist 110's schedule and the collaborator 112's schedule. In one or more implementations, to facilitate these additional actions, the collaboration system 126, through the APIs/SDKs 107 may surface the functionality of one or more other service provider systems 109, such as a streaming application, lending application, payment applications, appointment applications, loyalty applications, merchandising application, property rental or booking application, and so on In one or more implementations, the collaboration system 126 facilitates connecting third parties (e.g., brands) with the collaboration (e.g., the artist 110 and collaborator 112), so that the third parties can sponsor the collaboration. In at least one implementation, the disclosed methods and systems incorporate one or more revenue streams for artists using the collaboration system 126. In at least one implementation, the matching extends to an artist entity and a sponsor entity (e.g., based on demographic data) and the collaboration system 126 then facilitates creation of bespoke marketing content during the collaboration process. In this way, the marketing content may be adaptively integrated into the collaboration output at substantially the same time. For example, the marketing content may be adaptively integrated into a media platform and in a format customized for each of the platforms (and per label or other right owner's preferences of media display), e.g., in a display format or as a notification or interstitial within a media application. In some implementations, the collaboration output is tagged with tags to direct the content within the correct category or playlist. In one or more implementations, examples of sponsorship include enabling a brand to create marketing content during the collaboration process. For example, a brand may sponsor or pay for a collaboration that is associated with a market the brand is expanding into and produce a multi-part video series about the making of the collaboration. As another example, a third party may directly brand the collaboration's output itself, for example, a brand may sponsor a collaboration between two artists whose audiences represent target demographics in exchange for getting a "name drop" (e.g., the third-party's name included) in lyrics of a song. As a further example, the third-party can incorporate branding on touch points promoting the final output of the collaboration, such as social media posts, dedicated playlists, and/or launch events. Certainly, the collaboration system 126 may facilitate different connections with third parties than described above, including combinations of any one or more of the above-mentioned activities.

In one or more implementations, a success of the collaboration may be tracked. By way of example, measures of success may include one or more monetary metrics such as gross revenue, a number of listens, a number of streams, a frequency of listening, new users 104 (new to at least one of the collaboration's artists) reached (e.g., that listened to a collaboration), one or more users interacting with the collaboration (e.g., "liking" or "sharing" the collaboration or related content, demonstrating positive sentiment in relation to the collaboration). In one or more implementations, one or more measures of success are fed back into one or more of the model(s) 128 to update the model(s) 128, so that the model(s) 128 learn to recommend collaborators 112 based on "successful" collaborations.

In one or more implementations, the collaboration recommendations 142 can recommend collaborating on a single collaboration with more than one artist 108. In a scenario where the artist 110 is a country singer, for instance, the collaboration system 126 can recommend for a single collaboration a rap artist and an orchestral artist (e.g., violin).

In one or more implementations, an artist 110 may include more than one party. For example, the artist 110 may correspond to a band with multiple band members and/or an artist. In this scenario, the collaboration system 126 may utilize access controls so that different members of the band (e.g., and the band's manager) can access different portions (or functionality) of the artist platform 120.

Figure 2:
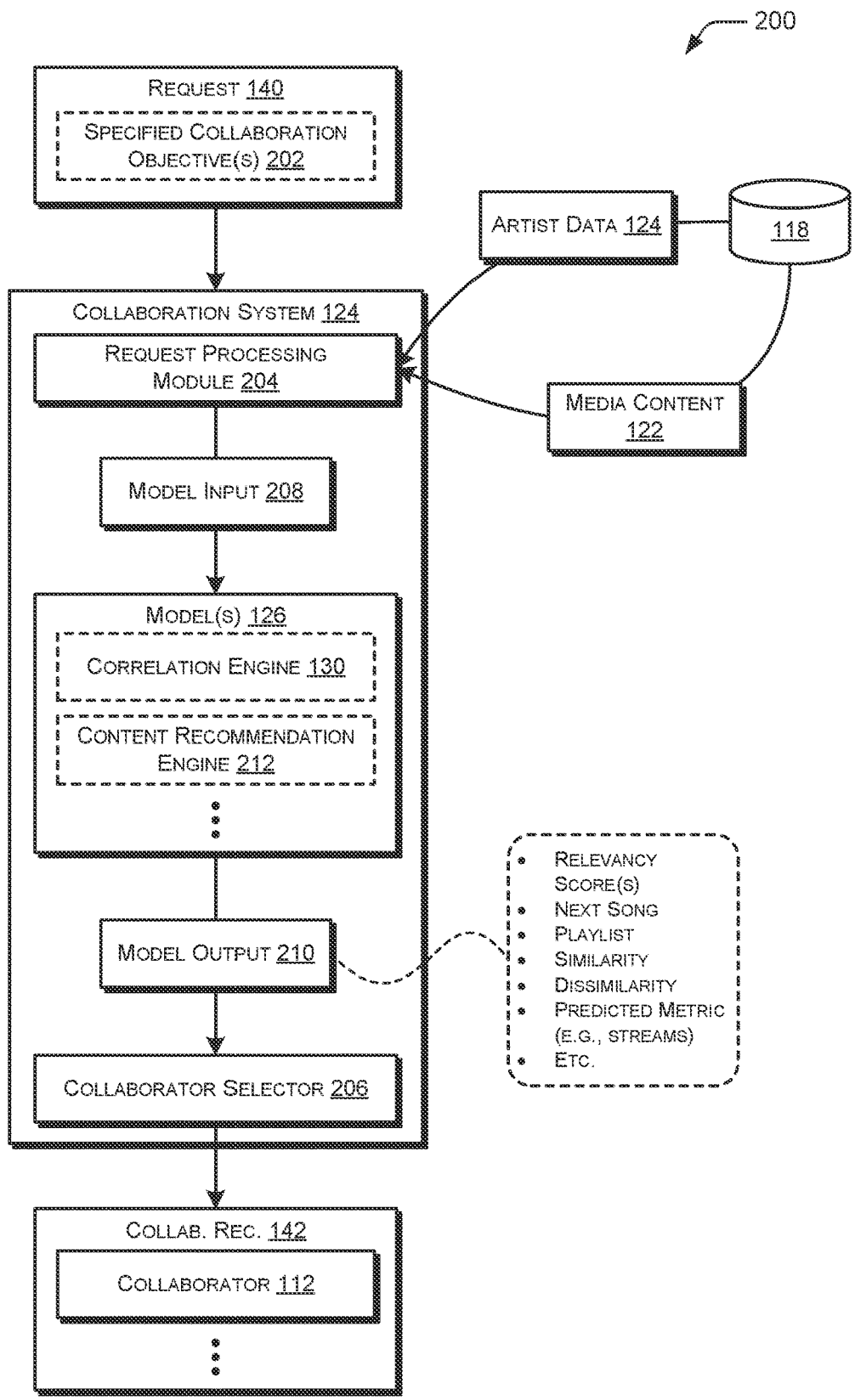
FIG. 2 is a non-limiting example of a collaboration system that filters a population of entities to recommend one or more of the entities as collaborators, according to an embodiment described herein.

FIG. 2 depicts a non-limiting structural and operational example 200 of a collaboration system that filters a population of entities to recommend one or more of the entities as collaborators.

In this example 200, the collaboration system 126 is depicted receiving the request 140. The request 140 is depicted with specified collaboration objective(s) 202, which are illustrated with dashed lines to indicate that the inclusion of such characteristics in the request 140 are optional in at least one variation. In one or more implementations, the collaboration system 126 receives the specified collaboration objective(s) 202 from the artist 110 via a user interface of the collaboration system 126 in connection with requesting a collaboration. By way of example and not limitation, an artist may specify one or more collaboration objectives that are to be used by the collaboration system 126 to identify collaborators, such criteria for the recommended collaborators being predicted to grow the artist's audience, specific and/or desired metrics achieved as a result of a collaboration (e.g., number of streams, level of predicted critical acclaim, generation of a "new sound", generation of a sound similar to an already-generated sound that is or was popular (on at least one multimedia platform)), collaborators being predicted to engage the artist's existing audience, and so forth. Alternatively or additionally, a user interface may allow an artist 110 to specify types of collaborators which the artist 110 is seeking for a collaboration, such as another artist 108, a venue or location manager, a merchandiser, a visual or graphic artist, a promoter, and any of the other various entities discussed above and below. Alternatively or additionally, the user interface may allow an artist 110 to specify characteristics that the collaboration system 126 may search for in past media content and/or in the artist data 124 of potential collaborators, such as a genre, one or more instruments, a similar characteristic or musical fingerprint, e.g., "sound," to the artist 110's media content, a dissimilar characteristic or musical fingerprint from the artist 110's media content, demographics of the artist (e.g., female vocalist, male rapper), and so forth. The request 140 may include a variety of specified collaboration objective(s) 202 without departing from the spirit or scope of the described techniques.

In accordance with the described techniques, the collaboration system 126 processes the request 140 to produce the collaboration recommendation 142, which recommends at least one collaborator 112 to the artist 110. Here, the collaboration recommendation 142 is depicted with ellipses to indicate that a collaboration recommendation 142 may include more than one collaborator 112. Additionally, collaboration recommendations received at different times may include different collaborators 112. For example, a first collaboration recommendation 142 received at a first time may include a first set of collaborators 112 and a second collaboration recommendation 142 received at a second, subsequent time may include a second set of collaborators 112, where the second set of collaborators includes at least one different collaborator from the first set. In some cases, differences in collaborators 112 at different times may be a result of the artist 110 changing one or more entries of the profile data 134 used to generate the collaboration recommendation 142, such as a location of the artist 110, a genre of music that the artist 110 has produced, and so forth. Although different sets of collaborators are discussed, in at least one scenario, at least two collaboration recommendation 142 surfaced to the artist 110 include the same set of collaborators 112.

The illustrated example 200 depicts one example of how the collaboration system 126 may process the request 140 to produce the collaboration recommendation 142. It is to be appreciated that the collaboration system 126 may process the request 140 in different manners than discussed in this example 200 and/or using different components than discussed without departing from the spirit or scope of the described techniques. Here, the collaboration system 126 is depicted including a request processing module 204, the model(s) 128, and a collaborator selector 206. However, in variations the collaboration system 126 may include more, fewer, or different components in accordance with the described techniques.

In one or more implementations, the request processing module 204 processes the request 140 (and the specified collaboration objective(s) 202) and outputs model input 208. In accordance with the described techniques, the model input 208 is configured to be received as input by one or more of the model(s) 128. By way of example, the model input 208 may be configured as one or more feature vectors or context-based artist fingerprints generated in connection with the request 140. In one or more implementations, the request processing module 204 obtains one or more of the media content 122 or the artist data 124 from the storage 118, and uses this data to generate the model input 208. For example, the request processing module 204 may generate an artist fingerprint indicative of one or more media content items (or all the media content items) associated with the artist 110 (e.g., songs of the artist 110) and also indicative of specified collaboration objective(s) 202, such as to further engage the artist 110's current audience 106 (as described by the artist data 124). In other words, the model input 208 may indicate to the model(s) 128 to recommend collaborators that are similar to the artist 110 and/or that will otherwise strengthen the artist 110's position with respect to a current audience. Alternatively, the request processing module 204 may generate an artist fingerprint indicative of one or more media content items (or all the media content items) associated with the artist 110 (e.g., songs of the artist 110) and also indicative of specified collaboration objective(s) 202 to expand beyond the artist 110's current audience 106 (as described by the artist data 124). In other words, the model input 208 may indicate to the model(s) 128 to recommend collaborators that are dissimilar (enough) to the artist 110 and/or that are associated with an audience 106 that is different from the artist 110. In one or more implementations, the request processing module 204 may also direct the model input 208 to one or more particular model(s) 128, e.g., based on the specified collaboration objective(s) 202. Based on the specified collaboration objective(s) 202, for instance, the request processing module 204 may direct the model input 208 to different types of models as discussed in more detail above, such as one or more models configured to select a next song, one or more models to generate a playlist, one or more models trained to optimize a performance metric (e.g., number of streams per amount of time, predicted critical success), and so forth.

In accordance with the described techniques, the model(s) 128 receive the model input 208 and produce the model output 210, which may be configured in a variety of ways and/or represent one or more of a variety of aspects in accordance with the described techniques. By way of example and not limitation, the model output 210 may correspond to or incorporate one or more of relevancy score(s) of other artists 108 as collaborators, one or more next songs such that the artists associated with those songs correspond to potential collaborators, a playlist such that the artists associated with songs of the playlist correspond to potential collaborators, values or scores indicative of similarity between the artist 110 and other artists 108, values or scores indicative of dissimilarity between the artist 110 and other artists, predicted metrics resulting from collaboration with other artists 108 (e.g., number of streams, increase in consumption by current audience, increase in consumption by a new audience), and so forth.

In this example 200, the model(s) 128 include the correlation engine 130 and a content recommendation engine 212. These models are illustrated with dashed lines to indicate that the models are optional, such that the model(s) 128 may include one or more of the depicted models (or none of the depicted models) in various implementations. The model(s) 128 are also depicted with ellipses to indicate that various other types of models may be used in accordance with the described techniques.

In one or more implementations, the correlation engine 130 uses natural language processing, and/or other contextual attributes, such as location, genre, and projects and/or recent media content output of artists or sellers similar to the artist 110. The correlation engine 130 may then determine a context-based artist fingerprint that corresponds to the request 140, such as by using underlying data associated with the request, such as artist data, listener data, audio, and video data. In one or more implementations, this underlying data is obtained through a capture device, e.g., a mobile phone of the artist 110 or of another user. This artist fingerprint is then compared with one or more context-based artists fingerprints of other artists in a database (e.g., in the storage 118) to identify a match, e.g., at the time when the artist fingerprint is taken. Matches need not be exact in various implementations, due to differences in levels, extraneous noise, imprecise or uncorrelated start times, etc., but may be considered to be matching if two artist fingerprints correspond above a threshold. In other implementations, the correlation engine 130 may compare the received artist fingerprint to other artist fingerprints over a prior period, such as a five-minute period. The correlation engine 130 may use any type of analysis to compare context-based artist fingerprints, including principle component analysis (PCA), Latent Dirichlet allocation (LDA), or any other such statistical analysis methods. In some implementations, the correlation engine 130 may generate match scores for the match of an artist fingerprint to other artist fingerprints in the database and identify as matching an artist fingerprint with a highest match score. In a further implementation, the correlation engine 130 may adapt match scores based on historical data associated with a client device of the artist 110, such as based on communications happening on a communication channel or other actual collaborations between two artists. Examples of actual communications which may be described by historical data to determine a match include but are not limited to liking a post or responding to a message, sentiment(s) of one or more messages (e.g., positive, neutral, or negative) between artists using natural language processing, etc.

Alternatively or additionally, the correlation engine 130 can be used to determine similarity to generate a list of similar users/members, albums, artists, songs, or genres, e.g., based on a user's ratings, preferences, play data, and/or explicit and/or implicit user behavior. Additionally, in one embodiment, the correlation engine 130 can create and/or enforce exclusion rules, e.g., ignore from the list the top N most popular artists (or albums, media files, genres) when calculating a similarity between two users, since overlap of these artists (or albums, media files, genres) may have less value in determining overall music-taste overlap. In the same vein, the correlation engine 130 can create preference rules, e.g., to accept certain artists who engage and have been observed to convert into collaborations, or weight collaborations with other artists more heavily than one or more other considerations when making a collaboration recommendation. The correlation engine 130, in one embodiment, can additionally or alternatively, approach affinity by highlighting the dissimilarities, e.g., instances where two artists or genres have not yet or infrequently collaborated, or where artists in disparate locations have not yet or infrequently collaborated.

With regard to dissimilarities, for instance, the correlation engine 130 can be used to determine dissimilarity to generate a list of dissimilar users/members, albums, artists, songs, or genres, e.g., based on a user's ratings, preferences, play data, and/or explicit and/or implicit user behavior. Additionally, in one embodiment, the correlation engine 130 can create exclusion rules, e.g., ignore from the list the top N most popular artists (or albums, media files, genres) when calculating a dissimilarity between two users. In the same vein, the correlation engine 130 can create preference rules, e.g., to accept certain dissimilar artists who engage and have been observed to convert into collaborations.

In this example 200, the model(s) 128 also include the content recommendation engine 212. In one or more implementations, the content recommendation engine 212 is configured to recommend media content and/or generate a curated list of media content, such as to recommend a "next song" and/or to generate a playlist of songs. The content recommendation engine 212 may generate a recommendation for an item of media content or generate a curated list of media content in a variety of ways in accordance with the described techniques. For example, the content recommendation engine 212 may recommend media content and/or generate a curated list of media content based on historical behavior and/or the specified collaboration objective(s) 202. The request processing module 204 may configure an artist profile for an artist 110 (or "artist fingerprint") that is similar to a listener profile of a listener (or "listener fingerprint"), for instance. Rather than describe the songs a listener listens to, however, the request processing module 204 can generate the artist profile to describe music of the artist (e.g., produced by, sung by, played by, or otherwise associated with the artist) and/or additional data describing the artist, e.g., specified preferences of a collaborator and/or characteristics of a collaboration to be produced. The content recommendation engine 212 may then use such a profile as a basis for determining a next song and/or generating a playlist, e.g., as the model output 210. In such scenarios, a next song or a generated playlist may serve as at least a basis for the collaboration recommendation 142. In other words, an artist 108 of a next song that is output by the content recommendation engine 212 (e.g., the model output 210) may be recommended as a collaborator in the collaboration recommendations 142. Similarly, one or more artists 108 of the various songs in a generated playlist output by the content recommendation engine 212 (e.g., the model output 210) may be recommended as collaborators in the collaboration recommendation 142.

In this example 200, the model output 210 is depicted being output to the collaborator selector 206. In one or more implementations, the collaborator selector 206 is configured to filter the model output 210 to select which collaborators associated with the model output 210 to include in the collaboration recommendation 142. For example, the collaborator selector 206 may select one or more artists having top relevancy scores (e.g., top 5) as described by the model output 210. Alternatively or additionally, the collaborator selector 206 may, based on one or more rules, avoid selecting a top N scoring collaborators and instead select artists to recommend as collaborators having a score after the top N.

Alternatively or additionally, the collaborator selector 206 may select some number of collaborators randomly (e.g., 1 in 3, 1 in 5, 1 in 7, 1 in 10) for recommendation via the collaboration recommendation 142. Alternatively or in addition, the collaborator selector 206 may avoid selecting one or more artists based on having been previously presented to the artist 110 as a recommended collaborator 112, such having been presented within some threshold amount of time. After the threshold amount of time, though, such collaborators may be resurfaced to the artist 110 via a collaboration recommendation 142. Alternatively, if an artist 108's score as a potential collaborator is so high, the collaborator selector 206 may override such timing rules and include the artist 108 as a collaborator 112 in the collaboration recommendation 142. The collaborator selector 206 may weight artists 108 based on a variety of other factors (e.g., contextual such as same locations (e.g., city, state, zip code, etc.) at a same time) to include the artists 108 as recommended collaborators 112 in the collaboration recommendation 142. The collaborator selector 206 may further filter the model output 210 in various ways to select which artists 108 to include as collaborators 112 in a given collaboration recommendation 142.

In one or more implementations, the collaboration system 126 may present one or more interface controls to the artist 110 along with a plurality of recommended collaborators of the collaboration recommendation 142, where the interface controls allow the artist 110 to select criteria for filtering the recommended collaborators presented to the artist 110. In this way, the collaboration system 126 may allow the artist 110 to "narrow down" the recommended collaborators with which the artist 110 would like to engage. In at least one variation, selection of an interface control for applying a filter causes the user interface which presents the plurality of recommended collaborators to no longer present collaborators that were filtered out based on application of a selected filter, e.g., presentations of the collaborators that were filtered out based on selection of the criteria are removed (e.g., visibly) from the user interface. In one or more implementations, the user interface also allows the artist 110 to undo or modify application of the criteria, such that the collaborators presented are updated, e.g., a recommended collaborator that was removed from the user interface, responsive to application of a filter, may be redisplayed or added back to the user interface. In connection with application of such criteria to filter recommended artists, the collaboration system 126 may, in one or more implementations, selectively enable various artists to apply such filters (e.g., based on a subscription level) and/or boost recommendations in a particular collaboration recommendation 142.

Additionally or alternatively, the collaboration system 126 provides a user interface interactive element which allows the artist 110 to select to refresh a collaboration recommendation 142. A "refresh" user interface interactive element may cause at least a portion of the collaboration recommendation(s) 142 presented in a user interface to be replaced with different collaboration recommendation(s) determined and provided using the techniques described herein.

In some examples, the collaboration system 126 may leverage location data to provide initial collaboration recommendations 142 and/or to rearrange an order of previously presented collaboration recommendations 142. For instance, the collaboration system 126 may establish a proximity around locations of individual artist devices (e.g., the computing device 111 of the artist 110 and/or the computing device 113 of the collaborator 112). Responsive to two or more artist proximities intersecting, the collaboration system 126 may recommend a collaboration between the artists 108. In examples, the proximities may be established using a geofence surrounding an individual artist 108's computing device. In an illustrative example, for instance, two artists 108 may both attend an event, and based on computing devices associated with the two artists 108 being within a venue of the event at a same or similar time, the collaboration system 126 may provide a collaboration recommendation 142, e.g., recommending to at least one of the two artists 108 that the two artists 108 collaborate. Alternatively or additionally, a proximity may be determined based on a communication channel being activated between two or more artist devices, such as by one artist device scanning an individualized quick response ("QR") code presented by a different artist's computing device. In response to scanning the QR code, the collaboration system 126 may provide a collaboration recommendation 142 as described herein. While the described examples demonstrate providing a collaboration recommendation 142 based on proximity, examples are also considered in which the collaboration system 126 rearranges an order of previously presented collaboration recommendation 142 based on other factors, such as by moving a previously presented recommendation from a current location in a list of collaboration recommendation 142 (e.g., a subordinate position of the list) to a first-ranked location (e.g., the "top" or) of a list of collaboration recommendations.

In the context of user interfaces for the collaboration system 126, consider the following discussion for FIGS. 3-7. In one or more implementations, such user interfaces are displayed via appropriately configured display devices that are associated with computing devices, e.g., the display devices are integral with the computing devices or are communicably coupled (via a wired or wireless connection).

Figure 3:
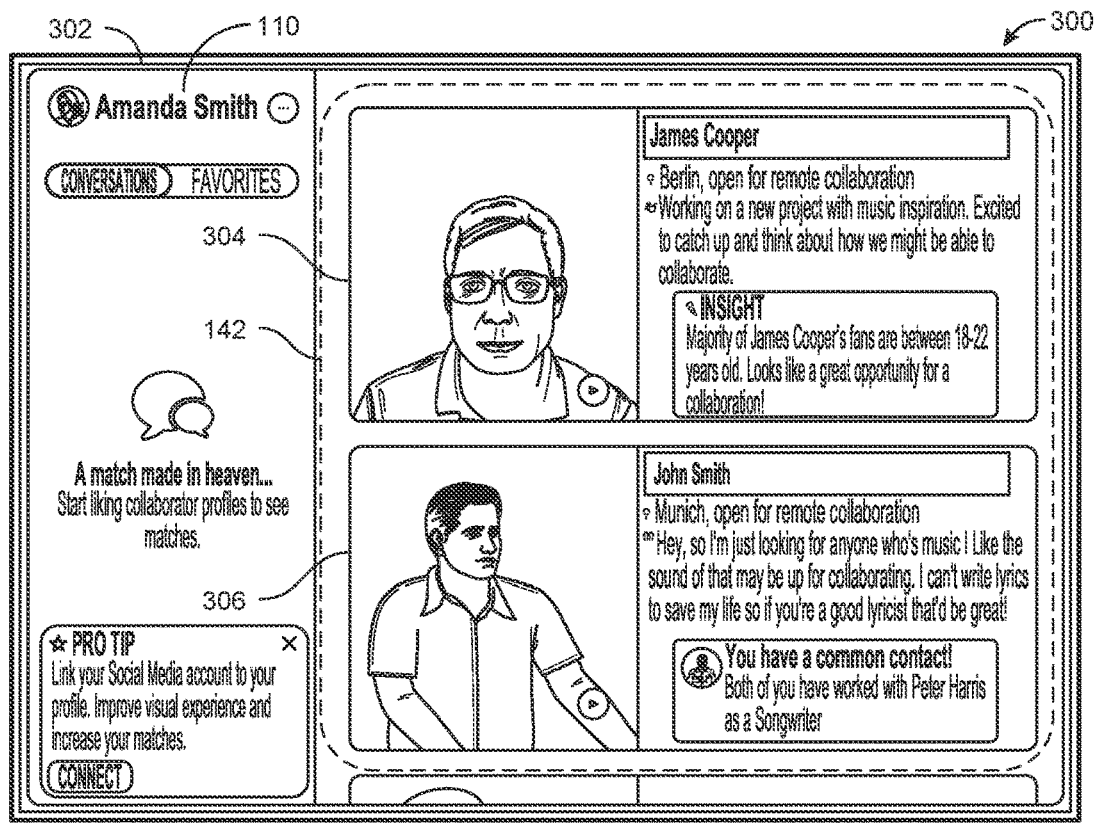
FIG. 3 is a non-limiting example of a user interface of an artist collaboration platform, according to an embodiment described herein.

FIG. 3 depicts a non-limiting example 300 of a user interface of an adaptive collaboration platform.

The illustrated example 300 depicts user interface 302 for the artist 110. In this example 300, the user interface 302 surfaces collaboration recommendations 142 generated for the artist 110 by the collaboration system 126. In this example 300, the collaboration recommendations 142 surfaced via the user interface 302 include a first artist 304 and a second artist 306, recommended to the artist 110 as collaborators 112. In one or more implementations, the user interface 302 also presents "insights" in association with one or more of the artists recommended to the artist 110 as collaborators 112. These insights indicate "why" recommended artists have been surfaced as potential collaborators 112 to the artist 110—such insights may provide a basis for the recommendation. In at least one variation, the artist 110 provides an input via the user interface 302 in order to view the insights for recommended collaborators 112.

To surface such insights via the user interface 302, the collaboration system 126 may process a variety of data (e.g., the profile data 134 and/or the audience data 136) to derive and generate one or more metrics about each potential collaborator that may be relevant to selecting the potential collaborators for collaboration. As part of this, the collaboration system 126 is capable of mapping the audience data (e.g., listening data, subscriber data, and/or other interaction data) to individual ones of the artists 108. Additionally, the collaboration system 126 may also compare the metrics generated for at least two different artists 108, such that insights can be provided for recommending one artist 108 as a collaborator 112 instead of one or more other artists 108. In one or more implementations, the collaboration system 126 may also decide which insight about a recommended artist 108 to surface via the user interface 302 based on an availability of the insight and/or ranking criteria for insights. In some examples, the collaboration system 126 may process data used to derive and generate metrics at regular intervals (e.g., per hour, per day, etc.) and update the metrics based on changes to the data during such intervals. Alternatively or additionally, the collaboration system 126 may process data and provide updated metrics in real time. For instance, if an artist 110 changes information in the profile data 134 such as age or location, the collaboration system 126 may update metrics to provide accurate collaboration recommendations 142 tailored to individual artists.

Figure 4:
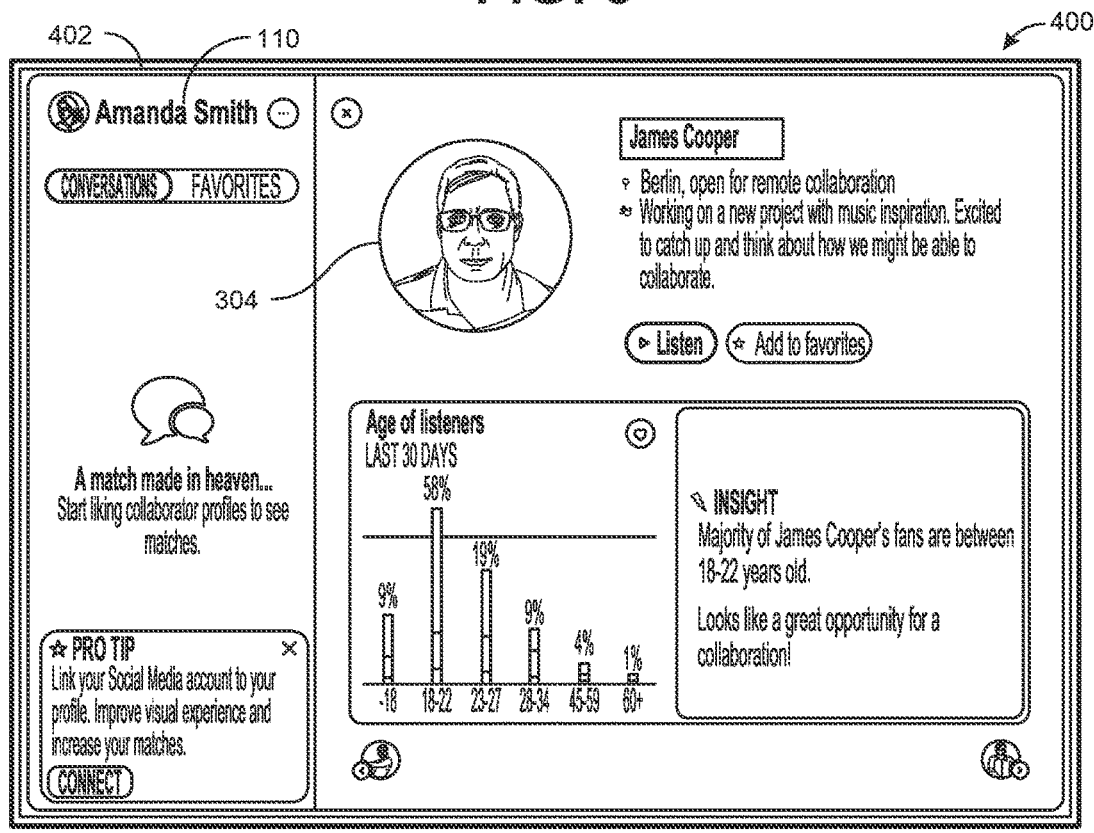
FIG. 4 is a non-limiting example of a user interface of an artist collaboration platform, according to an embodiment described herein.

FIG. 4 depicts a non-limiting example 400 of a user interface of an adaptive collaboration platform.

The illustrated example 400 depicts an additional user interface 402 surfaced to the artist 110, such as responsive to the user selecting the first artist 304 from the user interface 302. In one or more implementations, the user interface 402 presents additional information about the first artist 304, such as audience data. In this example, the audience data indicates demographic age data corresponding to the audience of the first artist 304. It is to be appreciated that the audience data displayed for an artist (e.g., the first artist 304) may include different data (e.g., number of streams per month, week, or day) without departing from the spirit or scope of the described techniques. In some examples, although not explicitly shown in the example 400, the user interface 402 may include data tailored to both the first artist 304 and the artist 110, indicating similarities and/or differences between the two (or more) artists. For instance, the user interface 402 may visually illustrate an overlap of listener demographics between the first artist 304 and the artist 110. In this way, the artist 110 may be dynamically provided with up-to-date information on specific characteristics that may be determined relevant to a potential collaboration with the first artist 304 based on detected conditions of the respective artists. In one or more implementations, the collaboration system 126 dynamically generates such visualizations of up-to-date information relevant to a potential collaboration by generating the visualizations in real-time responsive to receiving input via a user interface to view the additional user interface 402. By doing so, the series of user interfaces described herein is an improvement relative to conventional user interfaces because by waiting to dynamically generate the visualizations until a user input is received, computing resources, such as computer processing and storage, are not wastefully utilized, e.g., those resources are not used to generate visualizations that are not viewed. Even further, the user interface 402 may include one or more interactive elements that direct the artist 110 to social media pages associated with the first artist 304, to a website associated with the first artist 304, and so forth. The user interface 402 also includes controls to play media content (e.g., listen to music, watch a video) of the first artist 304 and a control to add the first artist 304 to a list of favorite artists. In this way, the artist 110 can save the first artist 304 in a list of artists to interact with at a later time. In some cases, adding the first artist 304 as a favorite of the artist 110 may not be visible to the first artist 304.

In one or more implementations, the user interface 402 may also present the one or more of the metrics derived from the audience data of the first artist 304, which supports one or more insights indicative of a basis for recommending the first artist 304 as a collaborator 112.

Figure 5:
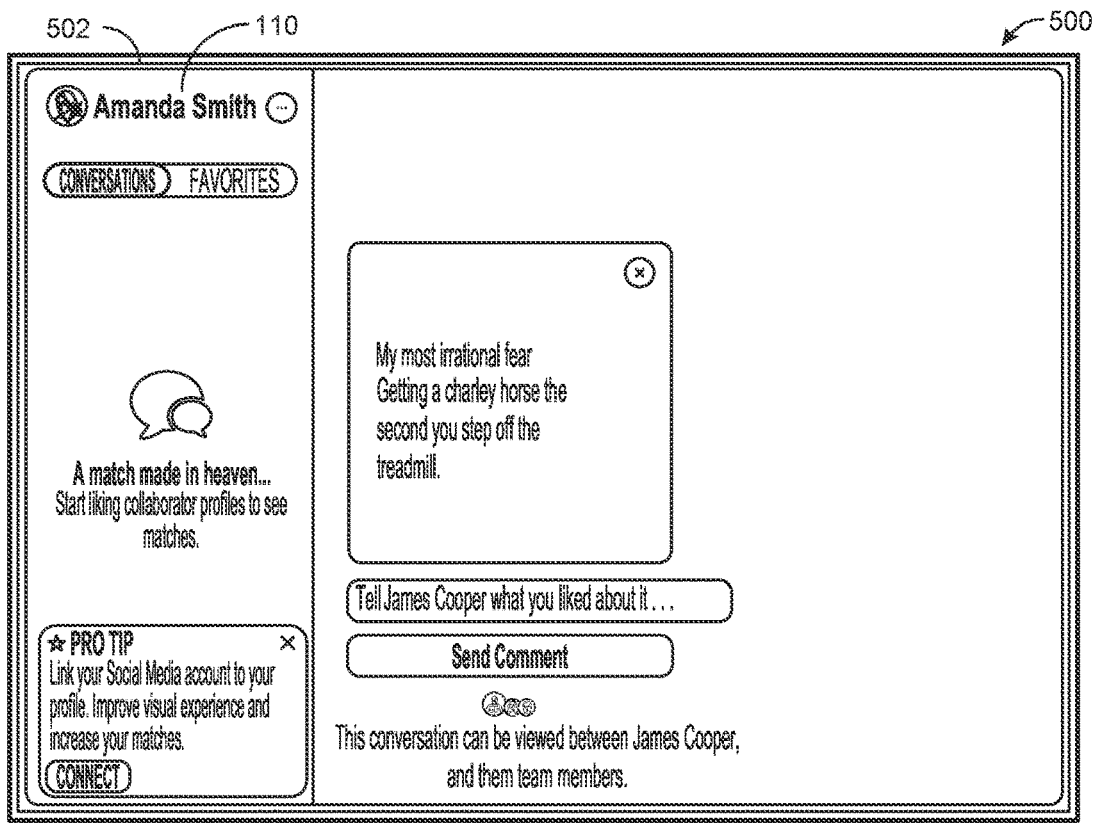
FIG. 5 is a non-limiting example of a user interface of an artist collaboration platform, according to an embodiment described herein.

FIG. 5 depicts a non-limiting example 500 of a user interface of an adaptive collaboration platform.

The example 500 depicts an additional user interface 502 depicting additional information associated with the first artist 304. In this case, the additional information corresponds to a quote of the first artist 304, and the user interface 502 includes a communication channel (e.g., chat interface) for establishing further communication with the first artist 304. In one or more implementations, the chat interface is presented to the artist 110 after the artist 110 "likes" a portion of the first artist 304's profile, e.g., the quote in this case. The collaboration system 126 may allow the artist 110 to provide input to express various sentimentalities (e.g., likes, dislikes, loves, celebrates, etc.) in relation to one or more portions of another artist's profile, such as insights, audio content, and visual content, to name just a few. The collaboration system 126 may also allow the artist 110 to remove an expressed sentimentality (e.g., remove a like) and/or change an expressed sentimentality (e.g., change a dislike to a like). In one or more implementations, the collaboration system 126 may provide instrumentalities that allow the artist 110 to exchange additional information, responsive to an initial expressed sentimentality.

Responsive to liking a portion of the first artist 304's profile, for instance, the collaboration system 126 may subsequently (and not prior to the initial expression of the sentimentality) allow the artist 110 to provide an additional expression, such as a comment (which may include text and/or emojis). In one or more implementations, this additional expression may or may not be removable or modifiable (e.g., edited). Additionally or alternatively, the collaboration system 126 may include this additional expression (e.g., comment) in a message thread between the artist 110 and the first artist 304. Accordingly, the collaboration system 126 may present this additional expression to the artist 110 in a message thread, e.g., in addition to showing the additional expression at the respective portion of profile of the first artist 304. Moreover, such a message thread is available for the artist 110 and/or the first artist 304 to respond to on the message thread, e.g., in addition to or separately from the additional expression made on the portion of content in the first artist 304's profile.

From the perspective of the first artist 304, in one or more implementations, the collaboration system 126 notifies the first artist 304 about sentimentalities expressed in relation to the first artist 304's profile or portions thereof, e.g., likes, dislikes, etc. In one or more implementations, the collaboration system 126 provides the first artist 304 an indication of which portions of the profile an expressed sentimentality was received for and a name or identifier of the artist 110 expressing the sentimentality.

Upon viewing an expressed sentimentality, additional expression, and/or a message from the artist 110, the collaboration system 126 may allow the first artist 304 to view the profile of the artist 110, and interact with it, e.g., express sentimentalities in relation to portions of the artist 110's profile, add additional expressions, and so on. As noted above, a message thread may also be presented to the first artist 304. In other words, the collaboration system 126 opens one or more communication channels between the artist 110 and the first artist 304 bi-directionally, rather than one-directionally. By waiting for a response from the first artist 304 (e.g., the collaborator), the collaboration system 126 may conserve communication resources and bandwidth that would be consumed if the one or more communication channels were created bi-directionally initially. In one or more implementations, as part of enabling the above-discussed functionality, the collaboration system 126 logs interactions from each of artist 110 and the first artist 304, such as likes, removal of such likes, comments, responses to comments, message threads, and so forth. This enables such communications to be processed and/or audited in the future.

Figure 6:
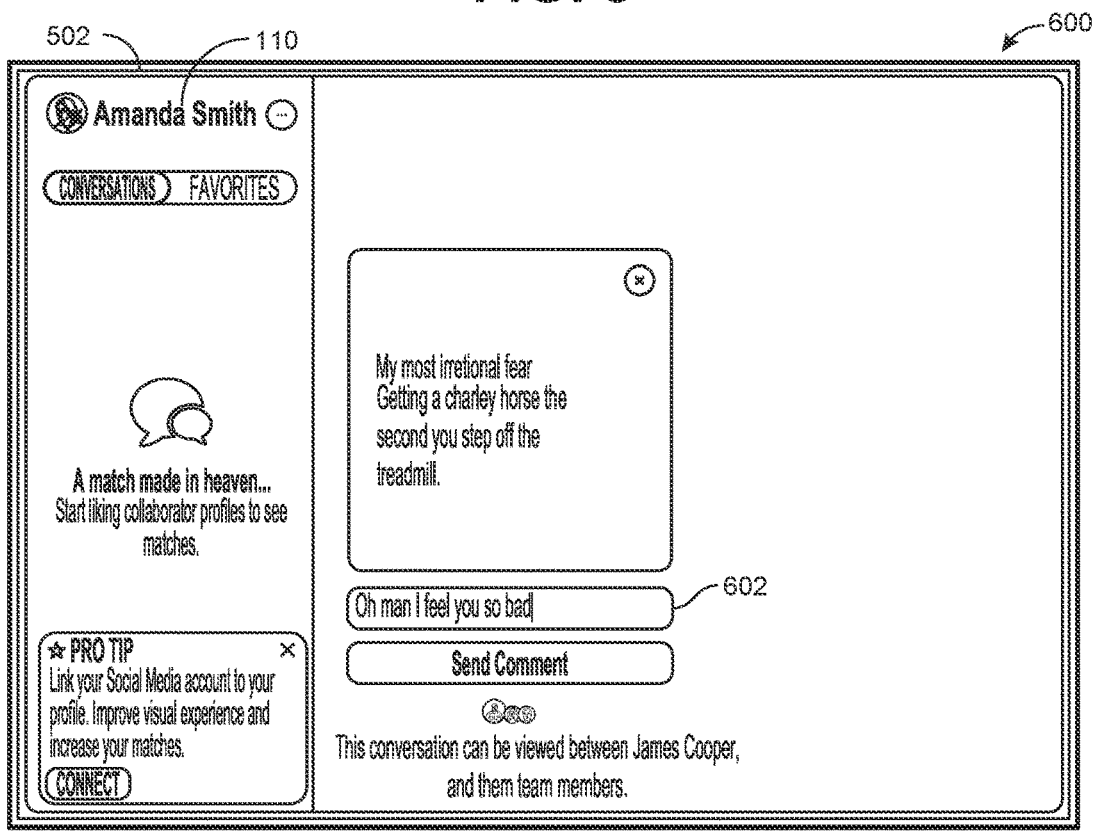
FIG. 6 is a non-limiting example of a user interface of an artist collaboration platform, according to an embodiment described herein.

FIG. 6 depicts a non-limiting example 600 of a user interface of an adaptive collaboration platform.

The example 600 depicts the additional user interface 502. In contrast to the example 500, though, the example 600 includes a message 602 from the artist 110 to the first artist 304. Responsive to the user selecting the control to send the entered message 602, the collaboration system 126 establishes a communication channel 144 from the artist 110 to the first artist 304 (e.g., the collaborator 112). Notably, sending the message via the communication channel 144 may also enable the first artist 304 to respond to the artist 110, initiating bilateral communication between the artist 110 and the first artist 304 (i.e., the collaborator 112). As noted elsewhere herein, the collaboration system 126 may limit a number of artists that are surfaced via the user interfaces described herein, such as filtering by relevancy scores, such that the artist 110 is presented with a limited set of data in the user interfaces corresponding to likely collaboration partners without surfacing unlikely collaboration partners. Further, this prevents unwanted communications between artists 108, conserving communication bandwidth, computer processing resources, and storage.

In one or more implementations, the collaboration system 126 enables the artist 110 to view members of the artist 110's team, e.g., administrators, agents, managers or other label roles. Further, the collaboration system 126 may allow the artist 110 to invite one or more such members to view the message 602 and/or subsequent messages, so that those members also receive the messages. The collaboration system 126 may allow the artist to limit such other team members to viewing those messages and/or participating in the exchange of messages (and/or other "enriched" information), in one or more implementations.

Team members that are invited to one or more messages between two artists (e.g., the artist 110 and a collaborator) are notified by the collaboration system 126 that the team members have been invited, e.g., via a text message, an email, and/or an application-specific notification, to name just a few. In one or more implementations, the collaboration system 126 provides invited team members with user interface controls that allow an invited team member to navigate to a message via a user interface and to view, in the user interface, a message thread that includes the message (e.g., an entirety or permitted portion of the message thread), e.g., upon entering the message thread. In one or more implementations, this includes accessing any enriched information, e.g., visualizations of metrics (e.g., graphs), exchanged content, and so on. Optionally, the collaboration system 126 provides an invited team member, that is invited to a message thread between the artist 110 and another artist 108 recommended as a collaborator 112, with access not only the thread relative to which the team member is invited but also one or more other threads between the artist 110 and the other artist 108 recommended as the collaborator 112, e.g., all other threads between the two artists or limited to threads between the two artists that the invited team member has been permitted to view and/or otherwise participate in. From a system standpoint, the collaboration system 126 may determine team members associated with each artist 108 (including the artist 110), such as by information received during registration and/or information subsequently received, which associates an artist 108 with the artist 108's team members. The collaboration system 126 may also include functionality to label team members with different roles and allow the team members to be surfaced as options from which the team members can be selected by respective artists 108 for engaging in a message thread. In one or more implementations, the collaboration system 126 may allow permitted team members to initiate message threads, e.g., with team members of other artists, without including the artists in those message threads.

Figure 7:
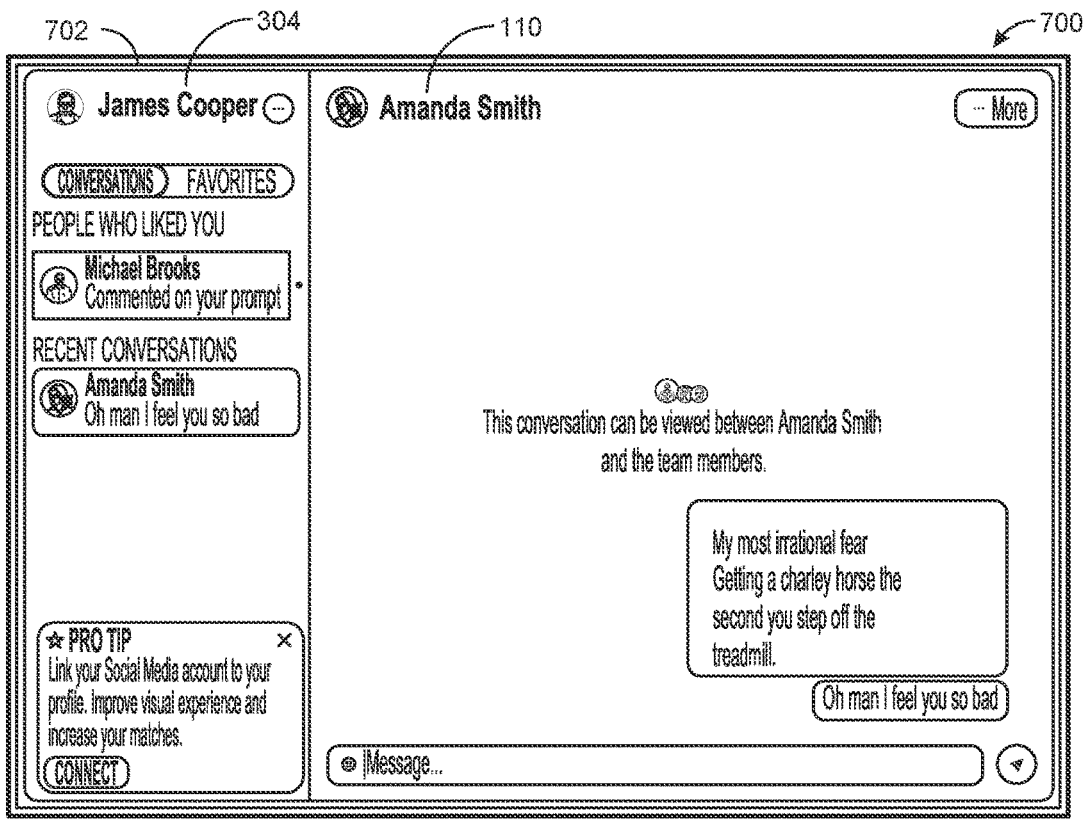
FIG. 7 is a non-limiting example of a user interface of an artist collaboration platform, according to an embodiment described herein.

FIG. 7 depicts a non-limiting example 700 of a user interface of an adaptive collaboration platform.

The example 700 depicts an additional user interface 702. In the continuing example, the user interface 702 is surfaced to the first artist 304, e.g., responsive to the communication channel 144 being established between the artist 110 and the first artist 304 and the message depicted in the example 600 being sent over the communication channel 144 to the first artist 304.

Figure 8:
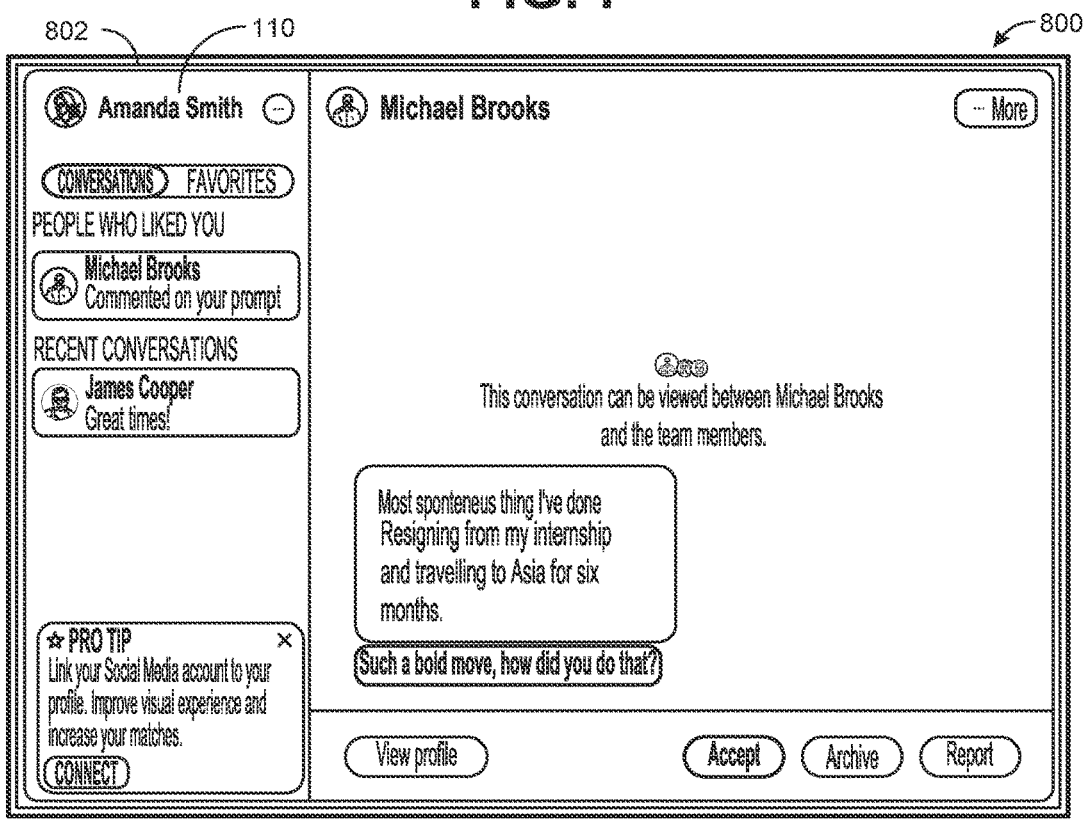
FIG. 8 is a non-limiting example of a user interface of an artist collaboration platform, according to an embodiment described herein.

FIG. 8 depicts a non-limiting example 800 of a user interface of an adaptive collaboration platform.

The example 800 depicts an additional user interface 802. The additional user interface 802 depicts a message exchange between the artist 110 and another artist 108 recommended to the artist 110 as a collaborator via the collaboration recommendation 142. In this example 800, a communication channel has been established between the artist 110 and the other artist. Although not explicitly depicted in the example 800, the additional user interface 802 may include interactive elements that enable the artist 110 to categorize and organize messages received via the media content service provider system 102. For instance, interactive elements that may be included in the additional user interface 802 may include tabs or categorizations of inbound connections (e.g., messages received from other artists), and/or tables or categorizations of outbound connections (e.g., messages sent by the artist 110 to other artists that were presented to the artist 110 as recommendations).

In one or more implementations, the collaboration system 126 surfaces communication channels that the artist 110 is likely to respond to. The artist 110 may "trust" the communications that are surfaced by the collaboration system 126 because access to the collaboration system 126 may be limited to verified artists, and surfaced artists are filtered based on data-driven collaboration metrics as described herein. collaboration system 126 Alternatively or in addition, if the collaboration system 126 surfaces a communication channel between the artist 110 and the collaborator 112 via a third-party, such as a via communication channel leveraging a social networking application (e.g., via the APIs/SDKs 107 and the at least one other service provider system 109), the artist 110 is able to trust the communication channel through the third party, e.g., because the channel has been established by the collaboration system 126 and involves confirming that the collaborator 112 is also an artist and that the collaborator 112 is recommended. Alternatively or in addition, the collaboration system 126 can send the artist 110 and/or the collaborator 112 a copy of an authenticated social networking profile of the other.

In some examples, the collaboration system 126 may provide the artist 110 with reminder notifications (e.g., in-application notification, push notification, text message, email, etc.) to respond to the various messages in the described communication channels. For instance, the collaboration system 126 may provide a reminder notification to the artist 110 at one or more time intervals after a message is received and/or viewed by the artist 110, such as once per day, once per week, once per month, and so forth. Reminder notifications provided by the collaboration system 126 may include an interactive element indicating that the artist 110 does not want to respond now, or a "not now" response (e.g., temporarily dismissing the reminder notification). Selection of a "not now" interactive element may cause another reminder notification to be provided to the artist 110 at an incremented time interval, which may be the same or different from the timer interval at which the collaboration system 126 is configured to provide reminder notifications prior to selection of the "not now" interactive element. Alternatively or additionally, the collaboration system 126 may include an interactive element indicating that the artist does not want to respond to a message indefinitely, or a "not-ever" response (e.g., no additional reminder notifications being provided). In some instances, selection of a "not-ever" response may cause an artist 108 to be blocked from sending the artist 110 additional messages on the collaboration system 126.

The following discussion describes examples of procedures for an adaptive collaboration platform. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, the following procedures include discussion of examples from the figures above but are not necessarily limited to the examples from those figures. In one or more implementations, for example, the procedures may be implemented using different systems (which can optionally include one or more components from the above-described example systems).

Figure 9:
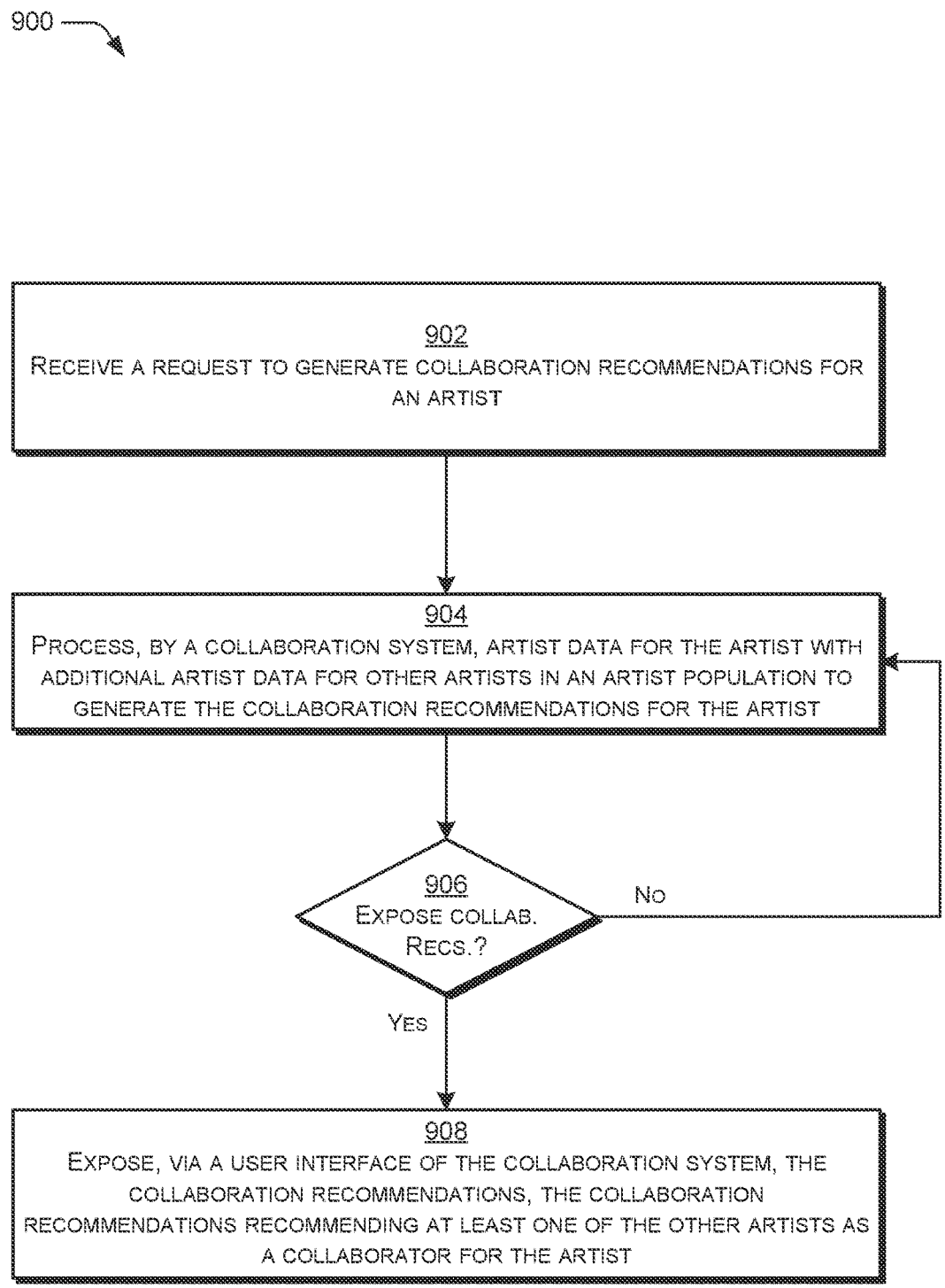
FIG. 9 is a procedure in an example implementation of an artist collaboration platform, according to an embodiment described herein.

FIG. 9 depicts a procedure 900 in an example implementation of an adaptive collaboration platform.

A request to generate collaboration recommendations for an artist is received (block 902). By way of example, a request 140 to generate collaboration recommendations 142 for an artist 110 is received by the collaboration system 126.

Artist data for the artist is processed by a collaboration system with additional artist data for other artists in an artist population to generate the collaboration recommendations for the artist (block 904). By way of example, artist data 124 for the artist 110 is processed by the collaboration system 126 with additional artist data 124 of other artists in the population of artists 108 to generate the collaboration recommendations 142 for the artist 110.

At block 906, a determination is made as to whether to expose one or more of the recommendations. By way of example, the collaboration system 126 may determine not to expose one or more of the collaboration recommendations 142 if the collaboration recommendations 142 have already been exposed to the user. The collaboration system 126 may determine not to expose one or more of the collaboration recommendations 142 based on various criteria, e.g., a "No" at block 906. For instance, the collaboration system 126 may filter one or more of the collaboration recommendations 142 provided based on various criteria, e.g., a recommendation was previously exposed to the artist 110 via a user interface, a recommendation does not match one or more characteristics specified by the artist 110, the recommendation is not in a "Top" number of recommendations, the recommendation corresponds to a less popular artist (e.g., below a threshold popularity and/or the recommended artist is relatively less popular than other artists), and so on. In such scenarios, the procedure 900 may return to block 904, such that the collaboration system 126 again processes the artist data 124 for the artist 110 with the additional artist data 124 of the other artists in the population of artists 108 to generate additional collaboration recommendations for the artist 110. Alternatively, the collaboration system 126 may, from artists that satisfy a threshold relevancy score, determine which artists to expose in the collaboration recommendation 142 based on a shared data point, such as liking a same post, artist location (e.g., current, during a same future date), liking a same sports team, sponsorship by a same entity, representation by a same label or "friendly" labels, representation by a same manager, and so forth.

The collaboration recommendations are exposed via a user interface of the collaboration system (block 908). In accordance with the principles discussed herein, the collaboration recommendations recommend at least one of the other artists as a collaborator for the artist. By way of example, the collaboration recommendation 142 are exposed via a user interface of the collaboration system 126 and recommend at least one of the other artists 108 as a collaborator 112 for the artist 110.

In some examples, the collaboration system 126 may provide the artist 110 with reminder notifications (e.g., in-application notification, push notification, text message, email, etc.) to respond to the various recommendations exposed to the artist 110 via the collaboration system 126 (e.g., a collaboration application). For instance, the collaboration system 126 may provide a reminder notification to the artist 110 at one or more time intervals after a recommendation is received and/or viewed by the artist 110, such as once per day, once per week, once per month, and so forth. Reminder notifications provided by the collaboration system 126 may include an interactive element indicating that the artist 110 does not want to respond to a recommendation now, or a "not now" response (e.g., temporarily dismissing the reminder notification). Selection of a "not now" interactive element may cause another reminder notification to be provided to the artist 110 at an incremented time interval, which may be the same or different from the timer interval at which the collaboration system 126 is configured to provide reminder notifications prior to selection of the "not now" interactive element. Alternatively or additionally, the collaboration system 126 may include an interactive element indicating that the artist does not want to respond to a recommendation indefinitely, or a "not-ever" response (e.g., no additional reminder notifications being provided). In some instances, selection of a "not-ever" response may cause an artist 108 to be blocked from being recommended to the artist 110 as part of subsequent collaboration recommendation 142. In one or more implementations, the artist 110's response to such reminder notifications is used at block 906 to determine whether to expose one or more of the collaboration recommendations 142.

Figure 10:
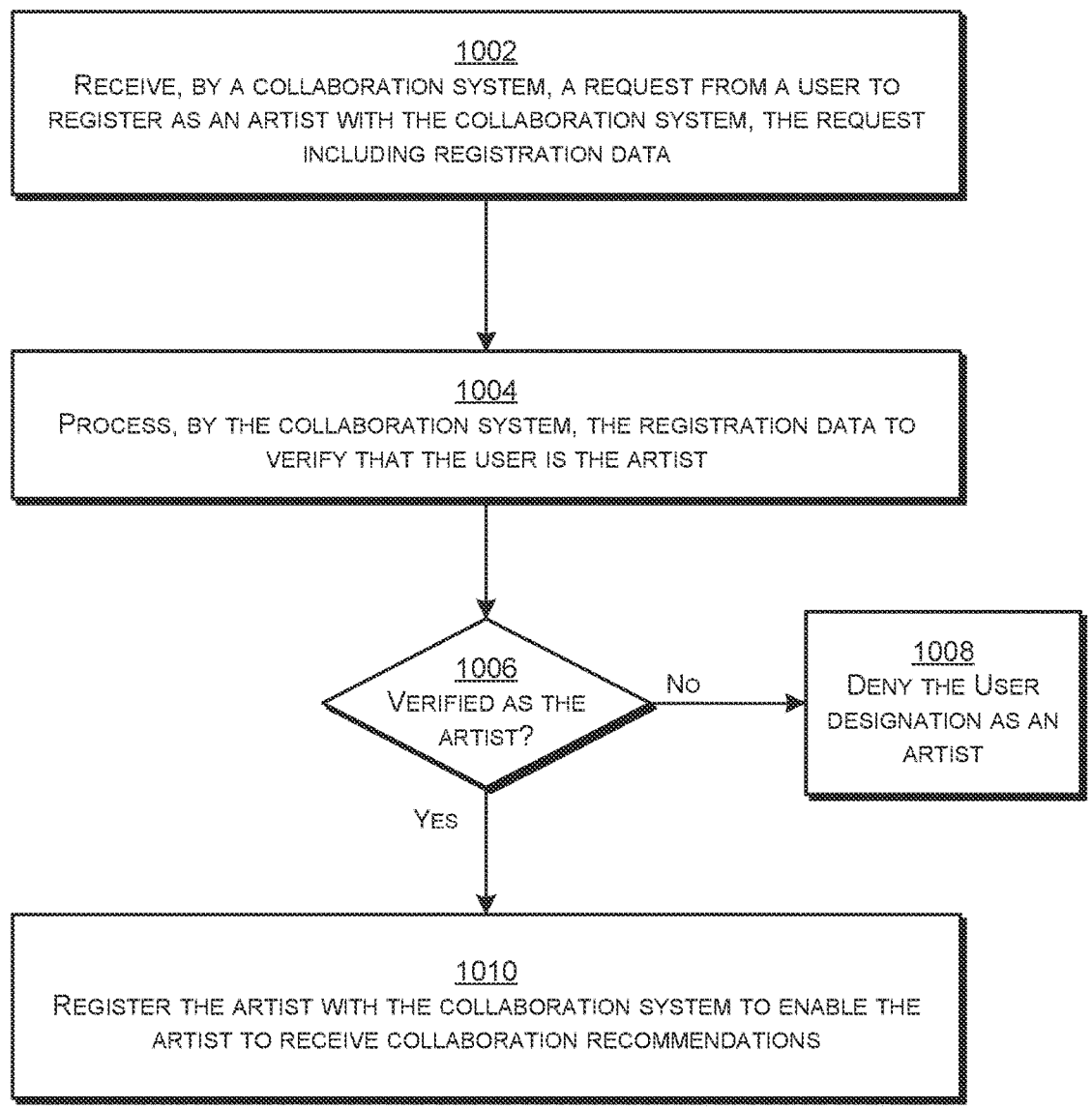
FIG. 10 is a procedure in an additional example implementation of an artist collaboration platform, according to an embodiment described herein.

FIG. 10 depicts a procedure 1000 in an additional example implementation of an adaptive collaboration platform.

A request to register as an artist with a collaboration system is received from a user (block 1002). In accordance with the principles discussed herein, the request incudes registration data. To register to become an artist 108, for example, a user may provide registration data 138 to the media content service provider system 102. The media content service provider system 102 may limit which of the users 104 are qualified to be designated as artists 108 based on the registration data 138. In one or more instances, for example, the media content service provider system 102 may deny a user 104 permission to access the artist platform 120 based on the registration data 138 and, as a result of such denial, the media content service provider system 102 may not designate the user 104 status as an artist 108.

The registration data is processed by the collaboration system to verify that the user is the artist (block 1004). For example, the media content service provider system 102 may include an access control system to ensure identity verification with respect to the user, and confirm that a user 104 registering to become an artist 108 "is who they say they are," which may include provision of various information such as social media accounts, email addresses, personally identifying information, biometric information, and so forth.

At block 1006, a determination is made as to whether the user is verified as the artist. By way of example, if, based on the review of the registration data 138, the access control system determines that user 104 is "who they say they are" the media content service provider system 102 may allow the user to be designated as an artist 108. In short, for example, the media content service provider system 102 may allow the user 104 to be designated as an artist 108 as long as the user 104 meets one or more acceptance criteria, e.g., based on artist preferences and permissions to be included in the collaboration platform, based on likelihood that an artist may be interested in collaboration (such as above 50% likelihood), based on a likelihood that another artist 108 will be interested in collaborating with the artist, and so on. In one or more implementations, the media content service provider system 102 may also implement various criteria to limit the population of artists 108 to actual artists, such as by requesting users to provide one or more samples of media content that the users have produced or performed, one or more reviews, and so forth.

However, if based on review of the registration data 138, the access control system determines that the user 104 is not "who they say they are" the media content service provider system 102 may deny the user designation as an artist 108, e.g., "No" at block 1006. If the media content service provider system 102 determines that the user 104 is not verified as the artist at block 1006, e.g., "No" at block 1006, the method proceeds to block 1008. At block 1008, the user is denied designation as an artist. By way of example, the media content service provider system 102 causes display of a user interface that notifies the user attempting to be verified as the artist that the user is not verified as the artist and is denied registration as an artist. Moreover, in one or more implementations, the media content service provider system 102 may also include functionality to notify the actual artist or person that an imposter is attempting to register as the actual artist or person on the artist platform 120. This can prevent fraud, intellectual property infringement (or theft), security vulnerabilities, and so on.

Responsive to determining that the user is the artist, the artist is registered with the collaboration system to enable the artist to receive collaboration recommendations (block 1010). By way of example, the media content service provider system 102 may grant a user 104 that meets the criteria for becoming an artist 108 permission to access functionality of the artist platform 120 or permission to access a portion of functionality of the artist platform 120 such that the user is able to receive collaboration recommendations 142. Registration with the collaboration system may also enable the artist to be recommended as a collaborator to other artists registered with the collaboration system.

Figure 11:
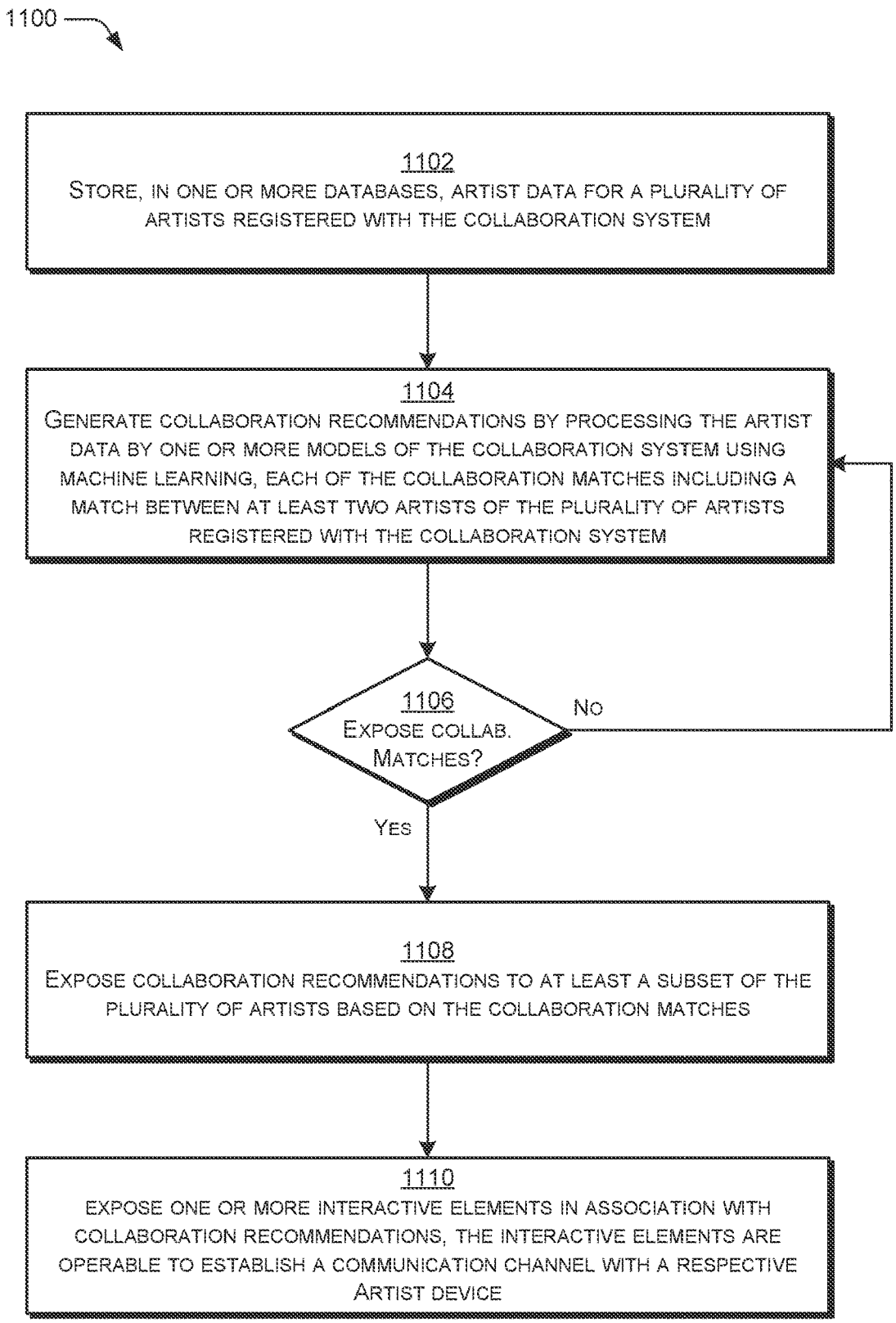
FIG. 11 is a procedure in an additional example implementation of an artist collaboration platform, according to an embodiment described herein.

FIG. 11 depicts a procedure 1100 in an additional example implementation of an adaptive collaboration platform.

Artist data for a plurality of artists registered with a collaboration system is stored in a storage (block 1102). By way of example, artist data 124 for a plurality of artists registered with the collaboration system 126 is stored in the storage 118. The storage 118 may be configured in various ways to store data. For instance, the storage 118 may include or otherwise have access to one or more databases, virtual storage, and so forth. In one or more implementations, each artist of the population of artists 108 includes an artist profile 132 in the artist data 124. The artist profile 132 may include, for example, profile data 134 and audience data 136.

Collaboration matches are generated by processing the artist data by one or more models of the collaboration system using machine learning (block 1104). In accordance with the principles discussed herein, each of the collaboration matches include a match between at least two artists of the plurality of artists registered with the collaboration system. By way of example, one or more models 128 of the collaboration system 126 processes the artist data 124 using machine learning in order to generate collaboration matches. In one or more implementations, the one or more models 128 generate collaboration match scores between artists of the plurality of artists registered with the collaboration system and compare the match scores to a threshold. A collaboration match is generated if a respective collaboration match score for at least two artists is above a threshold.

At block 1106, a determination is made as to whether to expose one or more of the collaboration matches. By way of example, the collaboration system 126 may determine not to expose one or more of the collaboration matches if the collaboration matches have already been exposed to the user. The collaboration system 126 may determine not to expose one or more of the collaboration matches based on various criteria, e.g., "No" at block 1106. For instance, the collaboration system 126 may filter one or more of the collaboration matches output by the model(s) 128 based on various criteria, e.g., a match was previously exposed to the artist 110 via a user interface, a match does not satisfy one or more characteristics specified by one of the matching artists, the match is not in a "Top" number of matches, the match corresponds to a less popular artist (e.g., below a threshold popularity and/or the matched artist is relatively less popular than other artists), and so on. In such scenarios, the procedure 1100 may return to block 1104, such that the collaboration system 126 again uses the model(s) 128 to process the artist data 124 and/or a different portion of the artist data 124 to generate additional collaboration matches. Alternatively, the collaboration system 126 may, from artists that satisfy a threshold relevancy score, determine which artists to expose in the collaboration recommendation 142 based on a shared data point, such as liking a same post, artist location (e.g., current, during a same future date), liking a same sports team, sponsorship by a same entity, representation by a same label or "friendly" labels, representation by a same manager, and so forth.

Collaboration recommendations are exposed to at least a subset of the plurality of artists based on the collaboration matches (block 1108). In accordance with the principles discussed herein, the collaboration recommendations recommend at least one of the other artists as a collaborator for the artist. By way of example, the collaboration recommendation 142 are exposed via a user interface of the collaboration system 126 and recommend at least one of the other artists 108 as a collaborator 112 for the artist 110 based on the artist 108 and collaborator 112 being identified as a collaboration match. In some cases, for a given collaboration match between two artists, just one of the two artists are notified of the collaboration match.

Interactive elements are exposed in association with the collaboration recommendations (block 1110). In accordance with the principles discussed herein, the interactive elements are operable (e.g., selectable) to establish a communication channel with a respective artist device. By way of example, the collaboration system 126 provides one or more interactive elements via the user interface 502 (e.g., a chat interface), with which the artist 110 can interact to establish a communication channel with the first artist 304. In this scenario, the first artist 304 has been presented to the artist 110 as a collaboration recommendation 142 via a user interface. Examples of such communication channels include, but are not limited to, in-application messaging (e.g., one or more intra-platform messaging functionalities), text messaging (e.g., facilitated by the platform), and one or more third-party platforms (e.g., social networking platforms), to name just a few. In one or more implementations, the collaboration system 126 suggests via a user interface moving communications on a third-party platform (e.g., a social networking platform, text message, and/or mobile phone) to the collaboration system 126, e.g., to enable tracking and use of collaboration functionalities provided by and made more streamlined by the collaboration system 126. In one or more implementations, the collaboration system 126 provides interactive elements for moving communications from a third-party platform to the collaboration system 126, e.g., to maintain a context of those communications.

Figure 12:
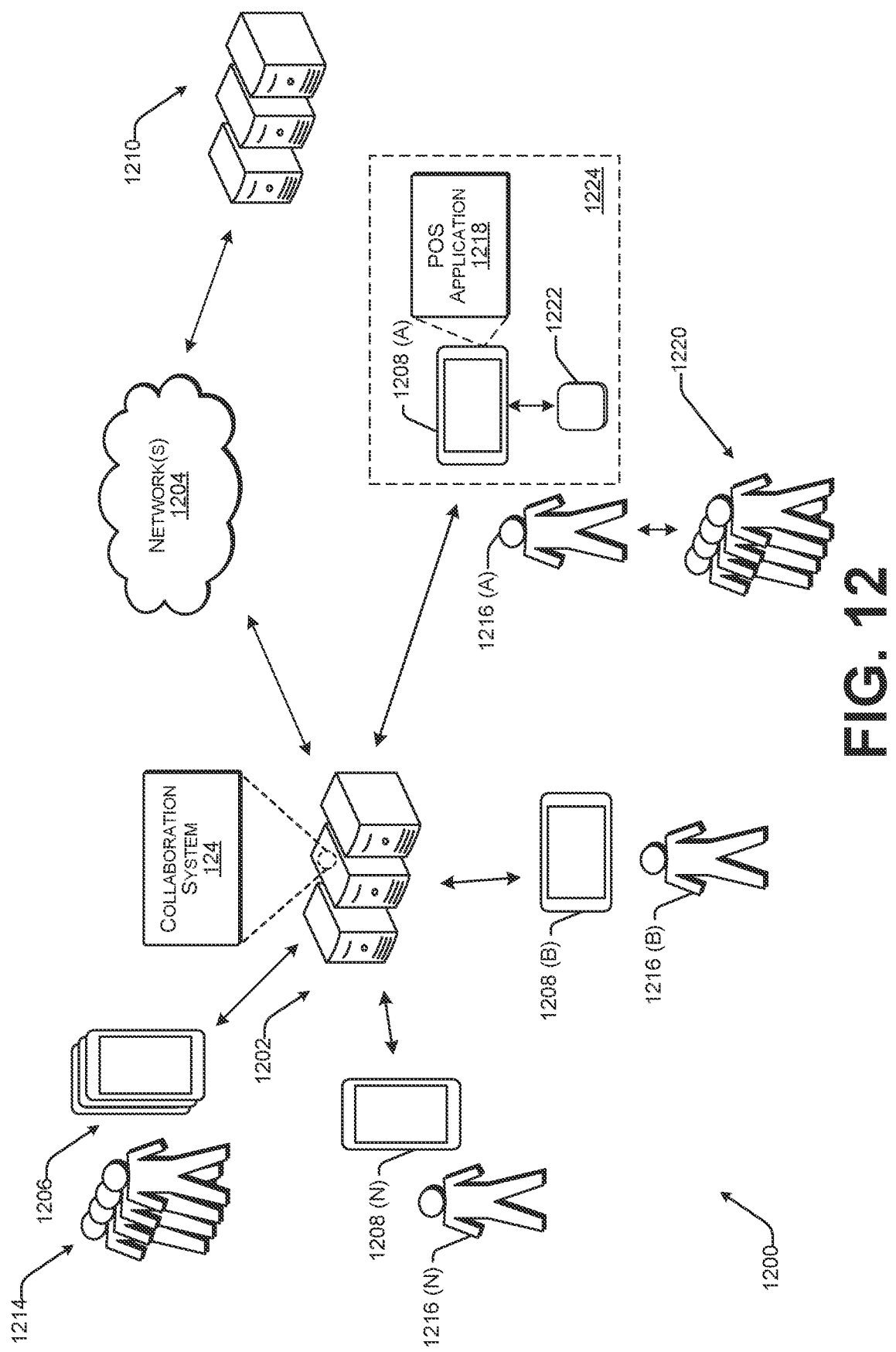
FIG. 12 is an example environment with which techniques described herein can be implemented, according to an embodiment described herein.

FIG. 12 illustrates an example environment 1200. The environment 1200 includes server(s) 1202 that can communicate over a network 1204 with user devices 1206 (which, in some examples can be merchant devices 1208 (individually, 1208(A)-1208(N))) and/or server(s) 1210 associated with third-party service provider(s). The server(s) 1202 can be associated with a service provider that can provide one or more services for the benefit of users 1214, as described below. Actions attributed to the service provider can be performed by the server(s) 1202.

In the context of the previously described figures, for example, at least a portion of the server(s) 1202 may be used to implement the collaboration system 126 and/or various portions of the media content service provider system 102.

The environment 1200 can include a plurality of user devices 1206, as described above. Each one of the plurality of user devices 1206 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1214. The users 1214 can be referred to as customers, buyers, merchants, sellers, borrowers, employees, employers, payors, payees, couriers and so on. The users 1214 can interact with the user devices 1206 via user interfaces presented via the user devices 1206. In the context of FIG. 3, for example, the users 1214 can interact with a client device via the user interface 302. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1206 can have an instance or versioned instance of an application, which can be downloaded from an application store, for example, which can present the user interface(s) described herein. In at least one example, a user 1214 can interact with the user interface via touch input, spoken input, or any other type of input.

As described above, in at least one example, the users 1214 can include merchants 1216 (individually, 1216(A)-1216(N)). In an example, the merchants 1216 can operate respective merchant devices 1208, which can be user devices 1206 configured for use by merchants 1216. By way of example, a merchant device 1208 may be configured with a user interface that enables a respective merchant to accept cryptocurrency payments from a user device 1206 of a customer. For the purpose of this discussion, a "merchant" can be any entity that offers items (e.g., goods or services) for purchase or other means of acquisition (e.g., rent, borrow, barter, etc.). The merchants 1216 can offer items for purchase or other means of acquisition via brick-and-mortar stores, mobile stores (e.g., pop-up shops, food trucks, etc.), online stores, combinations of the foregoing, and so forth. In some examples, at least some of the merchants 1216 can be associated with a same entity but can have different merchant locations and/or can have franchise/franchisee relationships. In additional or alternative examples, the merchants 1216 can be different merchants. That is, in at least one example, the merchant 1216(A) is a different merchant than the merchant 1216(B) and/or the merchant 1216(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1208 can have an instance of a POS application 1218 stored thereon. The POS application 1218 can configure the merchant device 1208 as a POS terminal, which enables the merchant 1216(A) to interact with one or more customers 1220. As described above, the users 1214 can include customers, such as the customers 1220 shown as interacting with the merchant 1216(A). For the purpose of this discussion, a "customer" can be any entity that acquires items from merchants. While two customers 1220 are illustrated in FIG. 12, any number of customers 1220 can interact with the merchants 1216. Further, while FIG. 12 illustrates the customers 1220 interacting with the merchant 1216(A), the customers 1220 can interact with any of the merchants 1216.

In at least one example, interactions between the customers 1220 and the merchants 1216 that involve the exchange of funds (from the customers 1220) for items (from the merchants 1216) can be referred to as "transactions." In at least one example, the POS application 1218 can determine transaction data associated with the POS transactions. Transaction data can include payment information, which can be obtained from a reader device 1222 associated with the merchant device 1208(A), user authentication data, purchase amount information, point-of-purchase information (e.g., item(s) purchased, date of purchase, time of purchase, etc.), etc. The POS application 1218 can send transaction data to the server(s) 1202 such that the server(s) 1202 can track transactions of the customers 1220, merchants 1216, and/or any of the users 1214 over time. Furthermore, the POS application 1218 can present a user interface to enable the merchant 1216(A) to interact with the POS application 1218 and/or the service provider via the POS application 1218.

In at least one example, the merchant device 1208(A) can be a special-purpose computing device configured as a POS terminal (via the execution of the POS application 1218). In at least one example, the POS terminal may be connected to a reader device 1222, which is capable of accepting a variety of payment instruments, such as credit cards, debit cards, gift cards, short-range communication-based payment instruments, and the like, as described below. In at least one example, the reader device 1222 can plug in to a port in the merchant device 1208(A), such as a microphone port, a headphone port, an audio-jack, a data port, or other suitable port. In additional or alternative examples, the reader device 1222 can be coupled to the merchant device 1208(A) via another wired or wireless connection, such as via a Bluetooth®, BLE, and so on. Additional details are described below with reference to FIG. 15. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1222, and communicate with the server(s) 1202, which can provide, among other services, a payment processing service. The server(s) 1202 associated with the service provider can communicate with server(s) 1210, as described below. In this manner, the POS terminal and reader device 1222 may collectively process transaction(s) between the merchants 1216 and customers 1220. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to the customers 1220. In additional or alternative examples, the POS terminal can have a display integrated therein for presenting information to the customers 1220. POS systems, such as the POS system 1224, may be mobile, such that POS terminals and reader devices may process transactions in disparate locations across the world. POS systems can be used for processing card-present transactions and card-not-present (CNP) transactions, as described below.

A card-present transaction is a transaction where both a customer 1220 and his or her payment instrument are physically present at the time of the transaction. Card-present transactions may be processed by swipes, dips, taps, or any other interaction between a physical payment instrument (e.g., a card), or otherwise present payment instrument, and a reader device 1222 whereby the reader device 1222 is able to obtain payment data from the payment instrument. A swipe is a card-present transaction where a customer 1220 slides a card, or other payment instrument, having a magnetic strip through a reader device 1222 that captures payment data contained in the magnetic strip. A dip is a card-present transaction where a customer 1220 inserts a payment instrument having an embedded microchip (i.e., chip) into a reader device 1222 first. The dipped payment instrument remains in the payment reader until the reader device 1222 prompts the customer 1220 to remove the card, or other payment instrument. While the payment instrument is in the reader device 1222, the microchip can create a one-time code which is sent from the POS system 1224 to the server(s) 1210 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1220 may tap or hover his or her payment instrument (e.g., card, electronic device such as a smart phone running a payment application, etc.) over a reader device 1222 to complete a transaction via short-range communication (e.g., NFC, RFID, Bluetooth®, BLE, etc.). Short-range communication enables the payment instrument to exchange information with the reader device 1222. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1224, the server(s) 1202, and/or the server(s) 1210 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1210. As described above, in at least one example, the server(s) 1210 can be associated with third-party service providers that provide payment services, including but not limited to, an acquirer bank, an issuer, a cryptocurrency exchange network, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1210 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1210 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1210 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1210 associated therewith), and a payment authorization message is communicated from the issuer to the POS device via a path opposite of that described above, or via an alternate path.

As described above, the server(s) 1210, which can be associated with payment service provider(s), may determine whether the transaction is authorized based on the transaction data, as well as information relating to parties to the transaction (e.g., the customer 1220 and/or the merchant 1216(A)). The server(s) 1210 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1210 to authorize or decline transactions.

Based on the authentication notification that is received by the POS system 1224 from server(s) 1202, the merchant 1216(A) may indicate to the customer 1220 whether the transaction has been approved. In some examples, approval may be indicated at the POS system 1224, for example, at a display of the POS system 1224. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1214 can access all of the services of the service provider. In other examples, the users 1214 can have gradated access to the services, which can be based on risk tolerance, IDV outputs, subscriptions, type of account with the service provider (e.g., merchant versus customer), and so on. In at least one example, access to such services can be availed to the merchants 1216 via the POS application 1218. In additional or alternative examples, each service can be associated with its own access point (e.g., application, web browser, etc.).

The service provider can offer payment processing services for processing payments on behalf of the merchants 1216, as described above. For example, the service provider can provision payment processing software, payment processing hardware and/or payment processing services to merchants 1216, as described above, to enable the merchants 1216 to receive payments from the customers 1220 when conducting POS transactions with the customers 1220. For instance, the service provider can enable the merchants 1216 to receive cash payments, payment card payments, and/or electronic payments from customers 1220 for POS transactions and the service provider can process transactions on behalf of the merchants 1216.

As the service provider processes transactions on behalf of the merchants 1216, the service provider can maintain accounts or balances for the merchants 1216 in one or more ledgers. For example, the service provider can analyze transaction data received for a transaction to determine an amount of funds owed to a merchant 1216(A) for the transaction. In at least one example, such an amount can be a total purchase price less fees charged by the service provider for providing the payment processing services. Based on determining the amount of funds owed to the merchant 1216(A), the service provider can deposit funds into an account of the merchant 1216(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1216(A) to a bank account of the merchant 1216(A) that is held at a bank or other financial institution (e.g., associated with the server(s) 1210). Scheduled deposits can occur at a prearranged time after a POS transaction is funded, which can be a business day after the POS transaction occurred, or sooner or later. In some examples, the merchant 1216(A) can access funds prior to a scheduled deposit. For instance, the merchant 1216(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1216(A) can have a payment instrument that is linked to the stored balance that enables the merchant to access the funds without first transferring the funds from the account managed by the service provider to the bank account of the merchant 1216(A).

In at least one example, the service provider may provide inventory management services. That is, the service provider may provide inventory tracking and reporting. Inventory management services may enable the merchant 1216(A) to access and manage a database storing data associated with a quantity of each item that the merchant 1216(A) has available (i.e., an inventory). Furthermore, in at least one example, the service provider can provide catalog management services to enable the merchant 1216(A) to maintain a catalog, which can be a database storing data associated with items that the merchant 1216(A) has available for acquisition (i.e., catalog management services). In at least one example, the catalog may include a plurality of data items and a data item of the plurality of data items may represent an item that the merchant 1216(A) has available for acquisition. The service provider can offer recommendations related to pricing of the items, placement of items on the catalog, and multi-party fulfillment of the inventory.

In at least one example, the service provider can provide business banking services, which allow the merchant 1216(A) to track deposits (from payment processing and/or other sources of funds) into an account of the merchant 1216(A), payroll payments from the account (e.g., payments to employees of the merchant 1216(A)), payments to other merchants (e.g., business-to-business) directly from the account or from a linked debit card, withdrawals made via scheduled deposit and/or instant deposit, etc. Furthermore, the business banking services can enable the merchant 1216(A) to obtain a customized payment instrument (e.g., credit card), check how much money the merchant 1216(A) is earning (e.g., via presentation of available earned balance), understand where the merchant 1216(A)'s money is going (e.g., via deposit reports (which can include a breakdown of fees), spend reports, etc.), access/use earned money (e.g., via scheduled deposit, instant deposit, linked payment instrument, etc.), feel in control of the merchant 1216(A)'s money (e.g., via management of deposit schedule, deposit speed, linked instruments, etc.), etc. Moreover, the business banking services can enable the merchants 1216 to visualize cash flow to track financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1216. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1214 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by one or more of the merchants 1216. In at least one example, the service provider can recommend and/or generate content items to supplement omni-channel presences of the merchants 1216. That is, if a merchant of the merchants 1216 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments, or from a digital wallet of the employer to a digital wallet of the service provider to be used to make the payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider. Additionally or alternatively, the service provider can enable employee(s) to receive cryptocurrency payments (or other digital assets) to digital wallets.

Moreover, in at least one example, the service provider can provide employee management services for managing schedules of employees. Further, the service provider can provide appointment services for enabling users 1214 to set schedules for scheduling appointments and/or users 1214 to schedule appointments.

In some examples, the service provider can provide restaurant management services to enable users 1214 to make and/or manage reservations, to monitor front-of-house and/or back-of-house operations, and so on. In such examples, the merchant device(s) 1208 and/or server(s) 1202 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1214 who can travel between locations to perform services for a requesting user 1214 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1206.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1214, voice inputs into a virtual assistant or the like, to determine intents of user(s) 1214. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1214 may be new to the service provider such that the user 1214 that has not registered (e.g., subscribed to receive access to one or more services offered by the service provider) with the service provider. The service provider can offer onboarding services for registering a potential user 1214 with the service provider. In some examples, onboarding can involve presenting various questions, prompts, and the like to a potential user 1214 to obtain information that can be used to generate a profile for the potential user 1214. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1214 providing all necessary information, the potential user 1214 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1210). That is, the service provider can offer IDV services to verify the identity of users 1214 seeking to use or using the service provider's services. Identity verification requires a customer (or potential customer) to provide information that is used by compliance departments to prove that the information is associated with an identity of a real person or entity. In at least one example, the service provider can perform services for determining whether identifying information provided by a user 1214 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1210 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1202) and/or the server(s) 1210 via the network(s) 1204. In some examples, the merchant device(s) 1208 are not capable of connecting with the service provider (e.g., the server(s) 1202) and/or the server(s) 1210, due to a network connectivity issue, for example. In additional or alternative examples, the server(s) 1202 are not capable of communicating with the server(s) 1210 due to network connectivity issue, for example. In such examples, devices may operate in "offline" mode where at least some payment data is stored (e.g., on the merchant device(s) 1208 and/or the server(s) 1202 until connectivity is restored and the payment data can be transmitted to the server(s) 1202 and/or the server(s) 1210 for processing.

In at least one example, the service provider can be associated with a hub, such as an order hub, an inventory hub, a fulfillment hub and so on, which can enable integration with one or more additional service providers (e.g., associated with the additional server(s) 1210). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1206 that are in communication with server(s) 1202 of the service provider. That is, techniques described herein are directed to a specific implementation—or a practical application—of utilizing a distributed system of user devices 1206 that are in communication with server(s) 1202 of the service provider to perform a variety of services, as described above. The unconventional configuration of the distributed system described herein enables the server(s) 1202 that are remotely-located from end-users (e.g., users 1214) to intelligently offer services based on aggregated data associated with the end-users, such as the users 1214 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein continuously or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (a merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1214 and user devices 1206. Furthermore, such features are changed dynamically based on the profiles of the users involved interacting with the GUIs. As such, techniques described herein are directed to improvements to computing systems.

Figure 13:
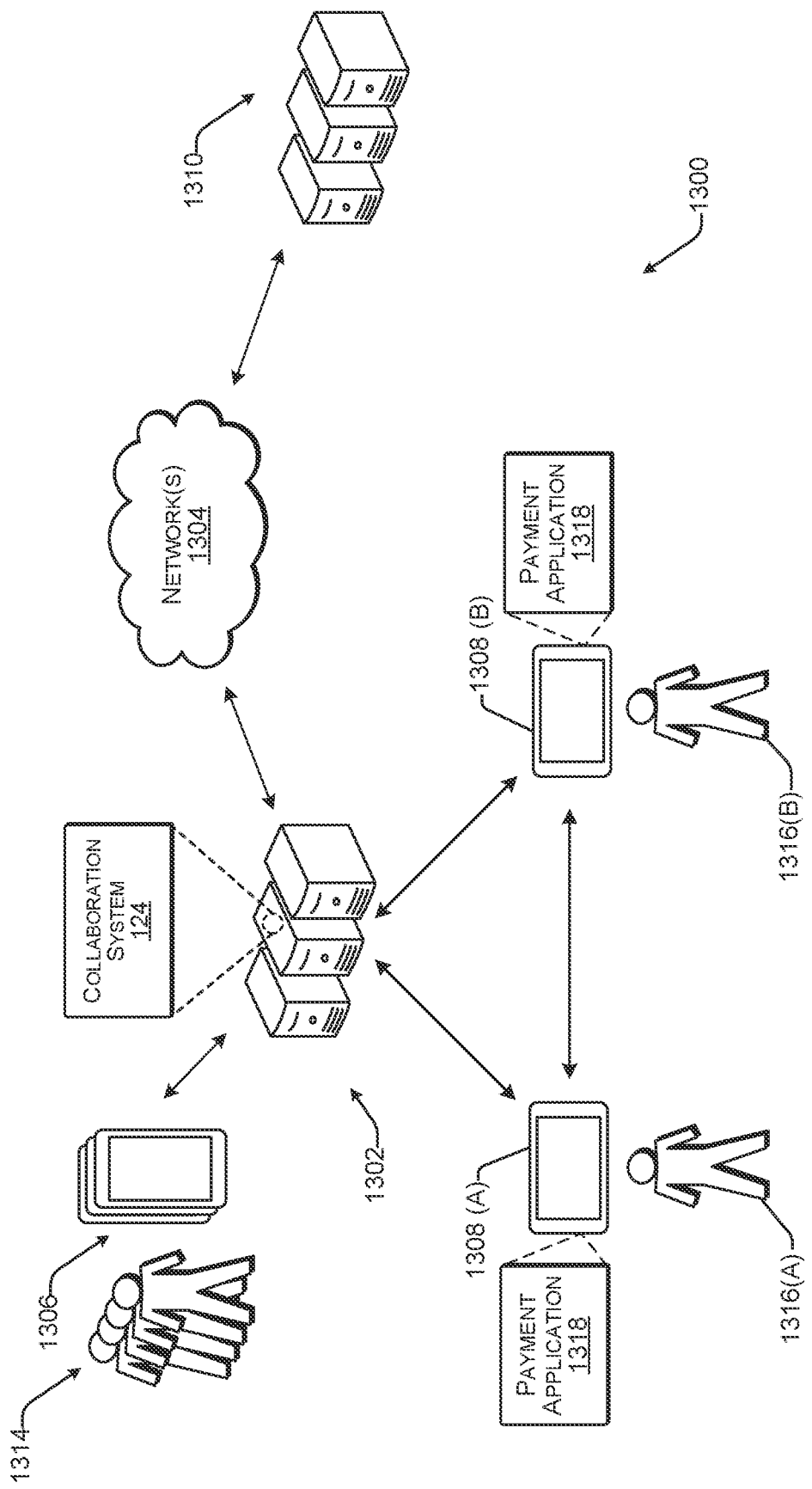
FIG. 13 is an example environment with which techniques described herein can be implemented, according to an embodiment described herein.

FIG. 13 illustrates an example environment 1300. The environment 1300 includes server(s) 1302 that can communicate over a network 1304 with user devices 1306 (which, in some examples can be user devices 1308 (individually, 1308(A), 1308(B)) and/or server(s) 1310 associated with third-party service provider(s). The server(s) 1302 can be associated with a service provider that can provide one or more services for the benefit of users 1314, as described below. Actions attributed to the service provider can be performed by the server(s) 1302. In some examples, the service provider referenced in FIG. 12 can be the same or different than the service provider referenced in FIG. 13.

In the context of previously described figures, for example, at least a portion of the server(s) 1302 and/or the server(s) 1310 may be used to implement the collaboration system 126 and/or various portions of the media content service provider system 102.

The environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as customers, buyers, merchants, sellers, borrowers, employees, employers, payors, payees, couriers and so on. The users 1314 can interact with the user devices 1306 via user interfaces presented via the user devices 1306. In the context of FIG. 3, for example, the users 1314 can interact with a client device via the user interface 302. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

In at least one example, the service provider can provide a peer-to-peer payment service that enables peer-to-peer payments between two or more users 1314. Two users, user 1316(A) and user 1316(B) are illustrated in FIG. 13 as "peers" in a peer-to-peer payment. In at least one example, the service provider can communicate with instances of a payment application 1318 (or other access point) installed on devices 1306 configured for operation by users 1314. In another example, an instance of the payment application 1318 executing on a first device 1308(A) operated by a payor (e.g., user 1316(A)) can send a request to the service provider to transfer an asset (e.g., fiat currency, non-fiat currency, digital assets, cryptocurrency, securities, gift cards, and/or related assets) from the payor to a payee (e.g., user 1316(B)) via a peer-to-peer payment. In some examples, assets associated with an account of the payor are transferred to an account of the payee, and an instance of the payment application 1318 executing on a second device 1308(B) operated by the payee (e.g., user 1316(B)) can display a control to accept the transaction and/or a notification that the transaction was executed. In some examples, assets can be held at least temporarily in an account of the service provider prior to transferring the assets to the account of the payee.

Figure 14:
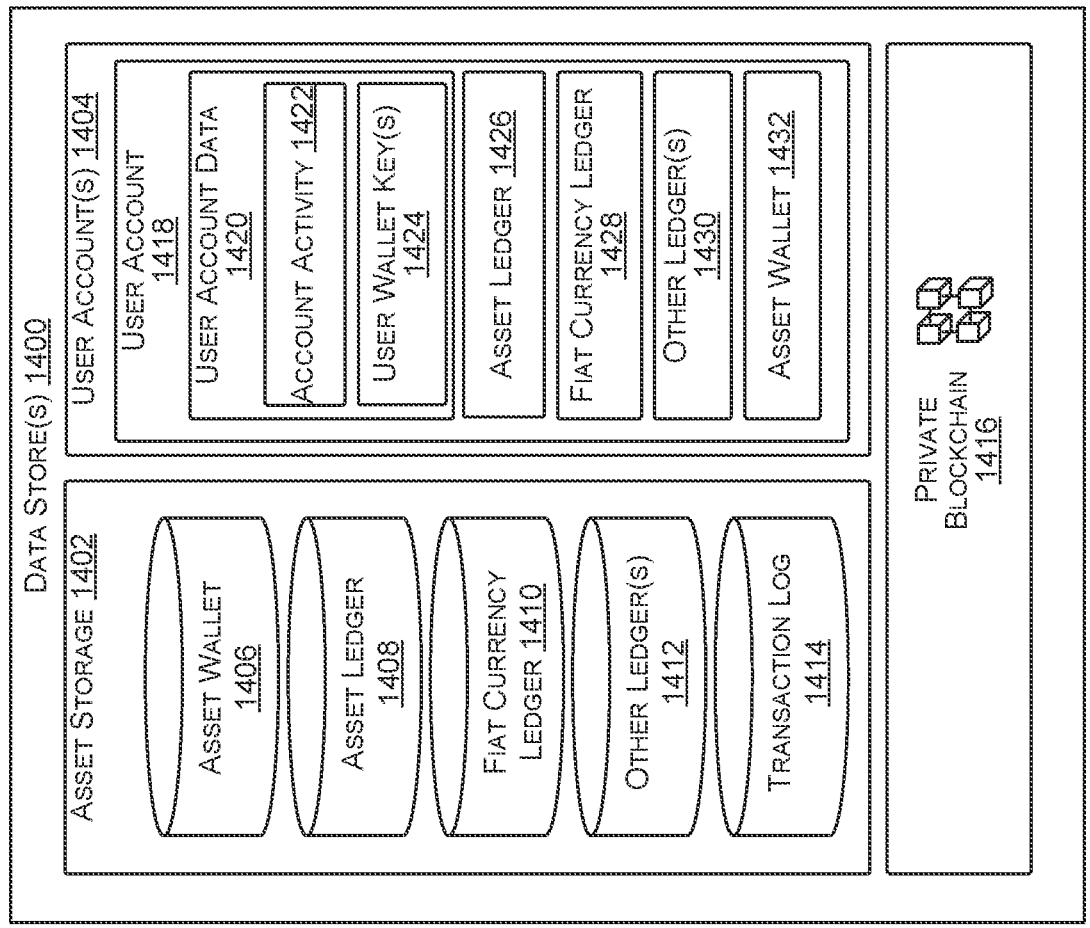
FIG. 14 is an environment associated with a ledger system with which techniques described herein can be implemented, according to an embodiment described herein.
Figure 14:
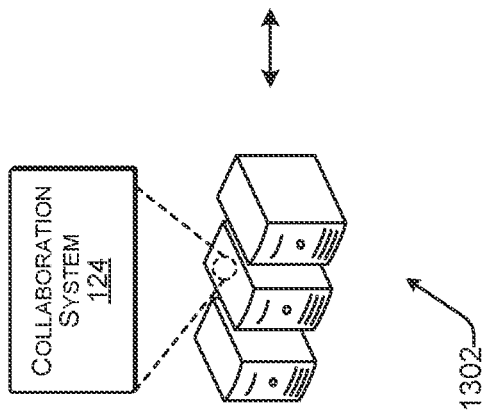

In some examples, the service provider can utilize a ledger system to track transfers of assets between users 1314. FIG. 14, below, provides additional details associated with such a ledger system. The ledger system can enable users 1314 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1318 executing on user device(s) of payee(s). As an example, the service provider can transfer assets from an account of user 1316(A) to an account of the user 1316(B) and can send a notification to the user device 1308(B) of the user 1316(B) for presentation via a user interface. The notification can indicate that a transfer is in process, a transfer is complete, or the like. In some examples, the service provider can send additional or alternative information to the instances of the payment application 1318 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1302 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1318 executing on the user devices 1306. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 13 or a third-party service provider associated with the server(s) 1310. In examples where the content provider is a third-party service provider, the server(s) 1310 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 13. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server(s) 1302 (which, in such an example can be called a "messaging server"). In some instances, the messaging application can include a payment application with messaging capability that enables users of the payment application to communicate with one another. In such instances, the payment application can be executed on a user device 1306 based on instructions transmitted to and from the server(s) 1302 (e.g., the payment service discussed in this description or another payment service that supports payment transactions). In some examples, the messaging application can be provided by a third-party service provider associated with the server(s) 1310. In examples where the messaging application is a third-party service provider, the server(s) 1310 can be accessible via one or more APIs or other integrations.

As described above, the service provider can facilitate peer-to-peer transactions, which can enable users 1314 to transfer fiat currency, non-fiat currency, cryptocurrency, securities, or other assets, or portions thereof, to other users 1314. In at least one example, individual users can be associated with user accounts. Additional details associated with user accounts and the transfer of assets between users 1314 are described below with reference to FIG. 14.

Furthermore, the service provider of FIG. 13 can enable users 1314 to perform banking transactions via instances of the payment application 1318. For example, users can configure direct deposits or other deposits for adding assets to various associated ledgers/balances. Further, users 1314 can configure bill pay, recurring payments, and/or the like using assets associated with associated accounts. In addition to sending and/or receiving assets via peer-to-peer transactions, users 1314 buy and/or sell assets via asset networks such as cryptocurrency networks, securities networks, and/or the like.

FIG. 14 illustrates example data store(s) 1400 that can be associated with the server(s) 1302.

In at least one example, the data store(s) 1400 can store assets in an asset storage 1402, as well as data in user account(s) 1404. In some examples, user account(s) 1404 can include merchant account(s) and/or customer account(s). In at least one example, the asset storage 1402 can be used to store assets managed by the service provider of FIG. 13. In at least one example, the asset storage 1402 can be used to record whether individual of the assets are registered to users. For example, the asset storage 1402 can include an asset wallet 1406 for storing records of assets owned by the service provider of FIG. 13, such as cryptocurrency, tokens (e.g., NFTs), digital content (e.g., music, videos, images, etc.), securities, or the like, and communicating with one or more asset networks, such as cryptocurrency networks, token networks, content exchange networks, securities networks, or the like. In some examples, the asset network can be a first-party network or a third-party network, such as a cryptocurrency exchange, an NFT exchange, or the stock market. In examples where the asset network is a third-party network, the server(s) 1310 can be associated therewith. In some examples, the asset wallet 1406 can communicate with the asset network via one or more components associated with the server(s) 1302.

The asset wallet 1406 can be associated with one or more addresses and can vary addresses used to acquire assets (e.g., from the asset network(s)) so that its holdings are represented under a variety of addresses on the asset network. In examples where the service provider of FIG. 13 has its own holdings of cryptocurrency (e.g., in the asset wallet 1406), a user can acquire cryptocurrency directly from the service provider of FIG. 13. In some examples, the service provider of FIG. 13 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In these various scenarios, the buying and selling of cryptocurrency, and therefore the associated updating of the public ledger of the asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1402 may contain ledgers that store records of assignments of assets to users 1314. Specifically, the asset storage 1402 may include asset wallet 1406, asset ledger 1408, fiat currency ledger 1410, and other ledger(s) 1412, which can be used to record transfers of assets between users 1314 of the service provider and/or one or more third-parties (e.g., merchant network(s), payment card network(s), ACH network(s), equities network(s), the asset network, securities networks, content licensing and distributing network(s), etc.). In doing so, the asset storage 1402 can maintain a running balance of assets managed by the service provider of FIG. 13. The ledger(s) of the asset storage 1402 can further indicate some of the running balance for each of the ledger(s) stored in the asset storage 1402 is assigned or registered to one or more user account(s) 1404.

In at least one example, the asset storage 1402 can include transaction logs 1414, which can include records of past transactions involving the service provider of FIG. 13. In at least one example, transaction data, as described herein, can be stored in association with the transaction logs 1414.

In some examples, the data store(s) 1400 can store a private blockchain 1416. A private blockchain 1416 can function to record sender addresses, recipient addresses, public keys, values of cryptocurrency transferred, and/or can be used to verify ownership of cryptocurrency tokens to be transferred. In some examples, the service provider of FIG. 13 can record transactions taking place within the service provider of FIG. 13 involving cryptocurrency until the number of transactions has exceeded a determined limit (e.g., number of transactions, storage space allocation, etc.). Based at least in part on determining that the limit has been reached, the service provider of FIG. 13 can publish the transactions in the private blockchain 1416 to a public blockchain (e.g., associated with the asset network), where miners can verify the transactions and record the transactions to blocks on the public blockchain. In at least one example, the service provider of FIG. 13 can participate as miner(s) at least for its transactions to be posted to the public blockchain.

In at least one example, the data store(s) 1400 can store and/or manage accounts, such as user account(s) 1404, merchant account(s), and/or customer account(s). In at least one example, the user account(s) 1404 may store records of user accounts associated with the users 1314. In at least one example, the user account(s) 1404 can include a user account 1418, which can be associated with a user (of the users 1314). Other user accounts of the user account(s) 1404 can be similarly structured to the user account 1418, according to some examples. In other examples, other user accounts may include more or less data and/or account information than that provided by the user account 1418. In at least one example, the user account 1418 can include user account data 1420, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment assets used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1420 can include account activity 1422 and user wallet key(s) 1424. The account activity 1422 may include a transaction log for recording transactions associated with the user account 1418. In some examples, the user wallet key(s) 1424 can include a public-private key-pair and a respective address associated with the asset network or other asset networks. In some examples, the user wallet key(s) 1424 may include one or more key pairs, which can be unique to the asset network or other asset networks.

In addition to the user account data 1420, the user account 1418 can include ledger(s) for account(s) managed by the service provider of FIG. 13, for the user. For example, the user account 1418 may include an asset ledger 1426, a fiat currency ledger 1428, and/or one or more other ledgers 1430. The ledger(s) can indicate that a corresponding user utilizes the service provider of FIG. 13 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 13.

In some examples, the asset ledger 1426 can store a balance for each of one or more cryptocurrencies (e.g., Bitcoin, Ethereum, Litecoin, etc.) registered to the user account 1418. In at least one example, the asset ledger 1426 can further record transactions of cryptocurrency assets associated with the user account 1418. For example, the user account 1418 can receive cryptocurrency from the asset network using the user wallet key(s) 1424. In some examples, the user wallet key(s) 1424 may be generated for the user upon request. User wallet key(s) 1424 can be requested by the user in order to send, exchange, or otherwise control the balance of cryptocurrency held by the service provider of FIG. 13 (e.g., in the asset wallet 1406) and registered to the user. The asset ledger 1426 can further record transactions of other digital assets associated with the user account 1418, and the user account 1418 can receive such assets from the asset network using the user wallet key(s) 1424. In some examples, the user wallet key(s) 1424 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 13 and the value is credited as a balance in asset ledger 1426), by purchasing currency in the form associated with the account using currency in a different form (e.g., buying a value of cryptocurrency from the service provider of FIG. 13 using a value of fiat currency reflected in fiat currency ledger 1428, and crediting the value of cryptocurrency in asset ledger 1426), or by conducting a transaction with another user (customer or merchant) of the service provider of FIG. 13 wherein the account receives incoming currency (which can be in the form associated with the account or a different form, in which the incoming currency may be converted to the form associated with the account). In some examples, the user account data 1420 can include preferences for maintaining balances of individual of the ledgers. For example, the service provider of FIG. 13 can automatically debit the fiat currency ledger 1428 to increase the asset ledger 1426, or another account associated with the user whenever the cryptocurrency balance (e.g., of the asset ledger 1426) falls below a stated level (e.g., a threshold). Conversely, in some embodiments, the service provider of FIG. 13 can automatically credit the fiat currency ledger 1428 to decrease the asset ledger 1426 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 13 (i.e., an external account). In at least one example, the user can transfer all or a portion of a balance of the cryptocurrency stored in the third-party cryptocurrency wallet to the service provider of FIG. 13. Such a transaction can require the user to transfer an amount of the cryptocurrency in a message signed by user's private key to an address provided by the service provider of FIG. 13. In at least one example, the transaction can be sent to miners to bundle the transaction into a block of transactions and to verify the authenticity of the transactions in the block. Once a miner has verified the block, the block is written to a public, distributed blockchain where the service provider of FIG. 13 can then verify that the transaction has been confirmed and can credit the user's asset ledger 1426 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund the user's cryptocurrency account. In some examples, the user can purchase cryptocurrency through services offered by the service provider of FIG. 13. As described above, in some examples, the service provider of FIG. 13 can acquire cryptocurrency from a third-party source. In such examples, the asset wallet 1406 can be associated with different addresses and can vary addresses used to acquire cryptocurrency so that its holdings are represented under a variety of addresses on a blockchain. When the service provider of FIG. 13 has its own holdings of cryptocurrency, users can acquire cryptocurrency directly from the service provider of FIG. 13. In some examples, the service provider of FIG. 13 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In the various examples, the buying and selling of cryptocurrency, and therefore the associated updating of the public ledger can be separate from any customer-merchant transaction, and therefore not necessarily time-sensitive.

In examples where the service provider of FIG. 13 has its own cryptocurrency assets, cryptocurrency transferred in a transaction (e.g., data with address provided for receipt of transaction and a balance of cryptocurrency transferred in the transaction) can be stored in the asset wallet 1406. In at least one example, the service provider of FIG. 13 can credit the asset ledger 1426 of the user. Additionally, while the service provider of FIG. 13 recognizes that the user retains the value of the transferred cryptocurrency through crediting the asset ledger 1426, any person that inspects the blockchain will see the cryptocurrency as having been transferred to the service provider of FIG. 13. In some examples, the asset wallet 1406 can be associated with many different addresses. In such examples, any person that inspects the blockchain may not easily associate all cryptocurrency stored in asset wallet 1406 as belonging to the same entity. It is this presence of a private ledger that is used for real-time transactions and maintained by the service provider of FIG. 13, combined with updates to the public ledger at other times, that allows for extremely fast transactions using cryptocurrency to be achieved. In some examples, the "private ledger" can refer to the asset ledger 1408, which in some examples, can utilize the private blockchain 1416, as described herein. The "public ledger" can correspond to a public blockchain associated with the asset network.

In at least one example, a user's asset ledger 1426, fiat currency ledger 1428, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1426. In some examples, a user can receive fiat currency or another currency in the form of payment for a transaction with another user. In at least one example, at least a portion of such funds can be converted into cryptocurrency by the service provider of FIG. 13 and used to fund the asset ledger 1426 of the user.

As addressed above, in some examples, users can also have other accounts maintained by the service provider of FIG. 13. For example, a user can also have an account in U.S. dollars, which can be tracked, for example, via the fiat currency ledger 1428. Such an account can be funded by transferring money from a bank account at a third-party bank to an account maintained by the service provider of FIG. 13 as is conventionally known. In some examples, a user can receive fiat currency in the form of payment for a transaction with another user. In such examples, at least a portion of such funds can be used to fund the fiat currency ledger 1428.

In some examples, a user can have one or more internal payment cards registered with the service provider of FIG. 13. Internal payment cards can be linked to one or more of the accounts associated with the user account 1418. In some embodiments, options with respect to internal payment cards can be adjusted and managed using an application (e.g., the payment application 1318).

In at least one example, as described above, each ledger can correspond to an account of the user that is managed by the service provider of FIG. 13. In at least one example, individual of the accounts can be associated with a wallet or a stored balance for use in payment transactions, peer-to-peer transactions, payroll payments, etc.

In at least one example, the user account 1418 can be associated with an asset wallet 1432. The asset wallet 1432 of the user can be associated with account information that can be stored in the user account data 1420 and, in some examples, can be associated with the user wallet key(s) 1424. In at least one example, the asset wallet 1432 can store data indicating an address provided for receipt of a cryptocurrency transaction, a blockchain token-based transaction, or a transaction for another digital asset implemented using a blockchain, to name just a few. In at least one example, the balance of the asset wallet 1432 can be based at least in part on a balance of the asset ledger 1426. In at least one example, funds availed via the asset wallet 1432 can be stored in the asset wallet 1432 or the asset wallet 1406. Funds availed via the asset wallet 1406 can be tracked via the asset ledger 1426. The asset wallet 1432, however, can be associated with additional cryptocurrency funds and other digital assets.

In at least one example, when the service provider of FIG. 13 includes a private blockchain 1416 for recording and validating cryptocurrency transactions, the asset wallet 1432 can be used instead of, or in addition to, the asset ledger 1426. For example, at least one example, a merchant can provide the address of the asset wallet 1432 for receiving payments. In an example where a customer is paying in cryptocurrency and the customer is associated with a cryptocurrency wallet account with the service provider of FIG. 13, the customer can send a message signed by its private key including its wallet address (i.e., of the customer) and identifying the cryptocurrency and value to be transferred to the merchant's asset wallet 1432. The service provider of FIG. 13 can complete the transaction by reducing the cryptocurrency balance in the customer's cryptocurrency wallet and increasing the cryptocurrency balance in the merchant's asset wallet 1432. In addition to recording the transaction in the respective cryptocurrency wallets, the transaction can be recorded in the private blockchain 1416, and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1426 and/or asset wallet 1432 are each described above with reference to cryptocurrency, the asset ledger 1426 and/or asset wallet 1432 can alternatively be used in association with securities and other digital assets, such as tokens (e.g., NFTs), smart contracts, and so forth. In some examples, different ledgers and/or wallets can be used for different types of assets. That is, in some examples, a user can have multiple asset ledgers and/or asset wallets for tracking cryptocurrency, securities, tokens (e.g., NFTs), smart contracts, or the like.

It should be noted that user(s) having accounts managed by the service provider of FIG. 13 is an aspect of the technology disclosed that enables technical advantages of increased processing speed and improved security.

Figure 15:
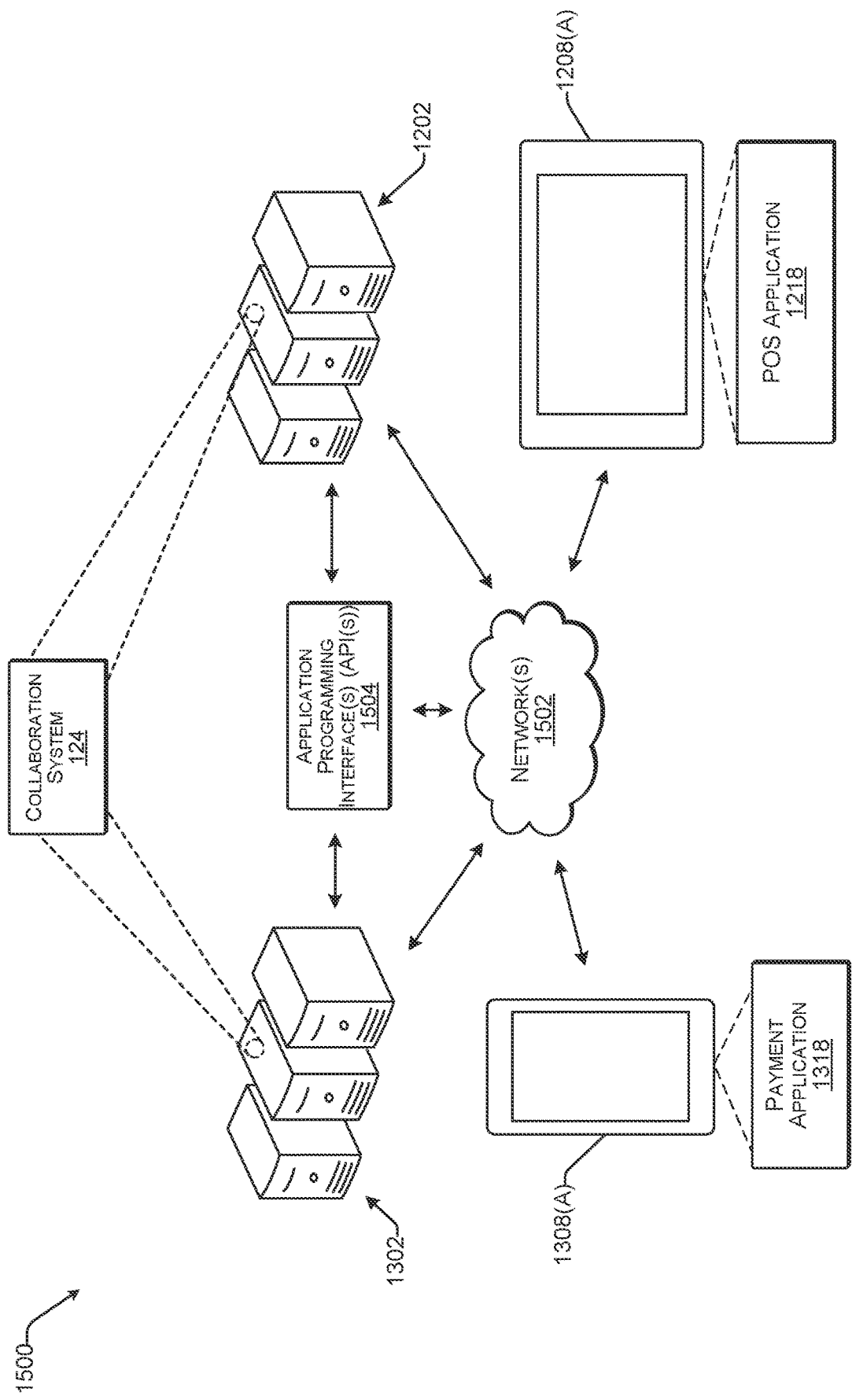
FIG. 15 is an example environment in which the environments of FIGS. 9 and 13 can be integrated to enable payments at the point-of-sale using assets associated with user accounts in the peer-to-peer environment of FIG. 13 with which techniques described herein can be implemented, according to an embodiment described herein.

FIG. 15 illustrates an example environment 1500 wherein the environment 1200 and the environment 1300 can be integrated to enable payments at the point-of-sale using assets associated with user accounts in the peer-to-peer environment of FIG. 13. As illustrated, each of the components can communicate with one another via one or more networks 1502. In some examples, one or more APIs 1504 or other functional components can be used to facilitate such communication.

In at least one example, the example environment 1500 can enable contactless payments, via integration of peer-to-peer payment, or other payment making, platform(s) and payment processing platform(s), are described herein. For the purpose of FIG. 15, the environment 1200 can refer to a payment processing platform and the environment 1300 can refer to a peer-to-peer payment, or payment making, platform. In an example, such an integration can enable a customer to participate in a transaction via an associated computing device instead of interacting with a merchant device of a merchant, such as the merchant device 1208(A). In such an example, the POS application 1218, associated with a payment processing platform and executable by the merchant device 1208(A) of the merchant, can present a Quick Response (QR) code, or other code that can be used to identify a transaction (e.g., a transaction code), in association with a transaction between the customer and the merchant. The QR code, or other transaction code, can be provided to the POS application 1218 via an API associated with the peer-to-peer payment platform. In an example, the customer can utilize an associated computing device, such as the user device 1308(A), to capture the QR code, or the other transaction code, and to provide an indication of the captured QR code, or other transaction code, to server(s) 1202 and/or server(s) 1302.

Based at least in part on the integration of the peer-to-peer payment platform and the payment processing platform (e.g., via the API), the server(s) 1202 and/or 1302 associated with each can exchange communications with each other—and with a payment application 1318 associated with the peer-to-peer payment platform and/or the POS application 1218—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1308(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using associated computing devices (e.g., mobile phones) to scan QR codes, or other transaction codes, encoded with data as described herein, to remit payments for transactions. In such a "scan to pay" example, a customer computing device, such as the user device 1308(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1218 and the payment application 1318, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using associated computing devices to scan or otherwise capture QR codes, or other transaction codes, encoded with data, as described herein, to remit payments for online/ecommerce transactions. In such a "scan to pay" example, a customer computing device, such as the user device 1308(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1208(A) can present a QR code, or other transaction code, that can be associated with a peer-to-peer payment platform. The customer can use a camera associated with the user device 1308(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1218 can cause a text message with a resource locator (e.g., uniform resource locator (URL)) that can be associated with a peer-to-peer payment platform to be sent to the user device 1308(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1308(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1218 of a merchant device 1208(A) at a brick-and-mortar store of a merchant to a payment application 1318 of a user device 1308(A) of a customer to enable the customer to participate in a transaction via an associated computing device. For instance, in a "scan to pay" example as described above, based at least in part on capturing the QR code, or other transaction code, via the user device 1308(A), the payment processing platform can provide transaction data to the peer-to-peer payment platform for presentation via the payment application 1318 on the user device 1308(A). In some examples, the customer can watch items being added to the customer's cart (e.g., via a user interface presented via the payment application). As an item is added to a virtual cart by the merchant—via the POS application 1218 on the merchant device 1208(A) of the merchant—the customer can see the item in the customer's virtual cart on the customer's own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1318 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1308(A) during or after payment of the transaction.

In some examples, based at least in part on capturing the QR code, or other transaction code, the payment processing platform can provide transaction data to the peer-to-peer payment platform for presentation via the payment application 1318 on the computing device of the customer, such as the user device 1308(A), to enable the customer to complete the transaction via the customer's own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1318 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via associated computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to associated carts to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1218, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1318 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 16:
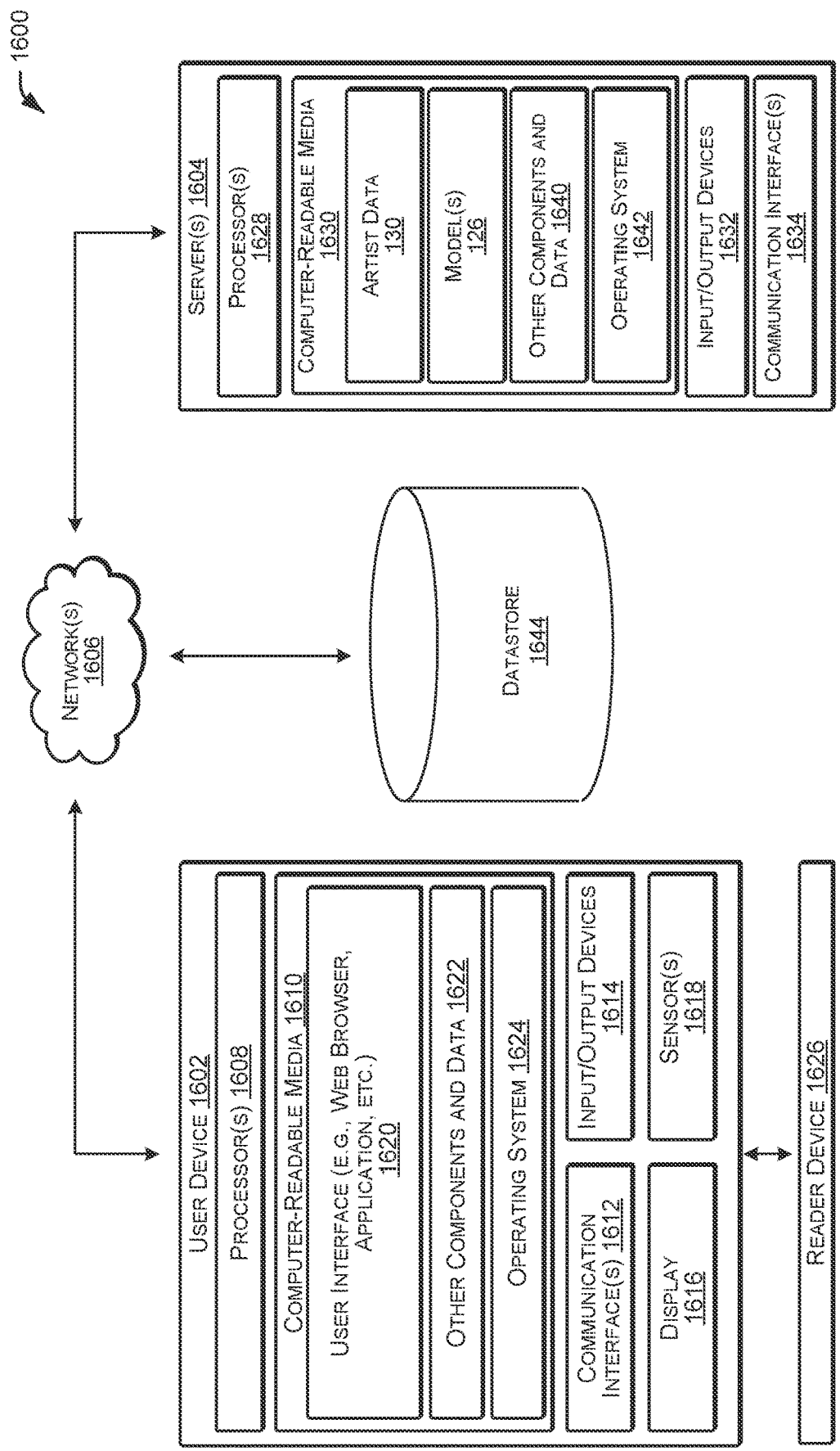
FIG. 16 is a block diagram showing a system for performing techniques described herein with which techniques described herein can be implemented, according to an embodiment described herein.

FIG. 16 depicts an illustrative block diagram illustrating a system 1600 for performing techniques described herein. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices, as described above with reference to FIG. 12 and FIG. 13.

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface(s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, components or components that can be executed by the processor(s) 1608. Further, when mentioned, non-transitory computer-readable media exclude media such as energy, carrier signals, electromagnetic waves, and signals per se.

The computer-readable media 1610 can be used to store and maintain any number of functional components that are executable by the processor(s) 1608. In some implementations, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, or the like. In other examples, the user interface 1620 can be presented via an application, such as a mobile application or desktop application, which can be provided by a service provider associated with the server(s) 1604, or which can be an otherwise dedicated application. In some examples, the user interface 1620 can be displayed to enable a user to initiate a cryptocurrency payment (or other digital asset transfer) to another user (e.g., to a merchant), to notify a recipient user that a payment (or other digital asset) has been received from a sending user, or to allow the recipient user to accept the transfer, to name just a few. In the context of previously described examples, the user interface 302 is an example of a user interface 1620 that may be displayed via a display 1616 of a respective user device 1602. In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

Depending on the type of the user device 1602, the computer-readable media 1610 can also optionally include other functional components and data, such as other components and data 1622, which can include programs, drivers, etc., and the data used or generated by the functional components. In addition, the computer-readable media 1610 can also store data, data structures and the like, that are used by the functional components. In accordance with the described techniques, for instance, the computer-readable media 1610 may also be used in variations to store one or more of the artist data 124 and the model(s) 128 discussed above. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 1614 can also include attachments that leverage the accessories (audio-jack, USB-C, Bluetooth, etc.) to connect with the user device 1602.

In at least one example, user device 1602 can include a display 1616. Depending on the type of computing device(s) used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, implementations herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what the user said the user was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when the customers leave a geofence, or location can be used to initiate an action responsive to users 1214 enter a brick-and-mortar store of a merchant. Location can be used in additional or alternative ways as well.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone port, a headphone port, an audio-jack, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware implementation, such as slots, magnetic tracks, and rails with one or more sensors or electrical contacts to facilitate detection and acceptance of a payment instrument. That is, the reader device 1626 may include hardware implementations to enable the reader device 1626 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1626 may also include a biometric sensor to receive and process biometric characteristics and process such biometric characteristics as payment instruments, given that such biometric characteristics are registered with the payment service and connected to a financial account with a bank server.

The reader device 1626 may include processing unit(s), computer-readable media, a reader chip, a transaction chip, a timer, a clock, a network interface, a power supply, and so on. The processing unit(s) of the reader device 1626 may execute one or more components and/or processes to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one component for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units, and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program components, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1630 can be used to store any number of functional components that are executable by the processor(s) 1628. In many implementations, these functional components comprise instructions or programs that are executable by the processors 1628 and that, when executed, specifically configure the one or more processors 1628 to perform the actions attributed above to the service provider and/or payment processing service. Functional components stored in the computer-readable media 1630 can optionally include the model(s) 128 and one or more other components and data 1640. Examples of such other components include but are not limited to, the audience platform 116, the artist platform 120, and the collaboration system 126, and examples of such other data include but are not limited to one or more of the media content 122, the artist data 124, and the model(s) 128.

In one or more implementations, the model(s) 128 can be trained using one or more machine-learning mechanisms. For example, a machine-learning mechanism can analyze training data (e.g., the media content 122 and/or the artist data 124) to train a data model that generates an output, which can be a collaboration recommendation 142, a relevancy score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1602 and/or the server(s) 1604 for use at a time after the data models have been trained (e.g., at runtime). Further, the one or more other components and data 1640 can include programs, drivers, etc., and the data used or generated by the functional components. Further, the server(s) 1604 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software development kit (SDK) can be provided by the service provider to allow third-party developers to include service provider functionality and/or avail service provider services in association with the third-party developers' own third-party applications. Additionally or alternatively, in some examples, the service provider can utilize an SDK to integrate third-party service provider functionality into its applications. That is, API(s) and/or SDK(s) can enable third-party developers to customize how respective third-party applications interact with the service provider or vice versa.

The computer-readable media 1630 can additionally include an operating system 1642 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include a datastore 1644 that can be configured to store data that is accessible, manageable, and updatable. In some examples, the datastore 1644 can be integrated with the user device 1602 and/or the server(s) 1604. In other examples, as shown in FIG. 12, the datastore 1644 can be located remotely from the server(s) 1604 and can be accessible to the server(s) 1604. The datastore 1644 can comprise multiple databases and/or servers connected locally and/or remotely via the network(s) 1606.

In at least one example, the datastore 1644 can store user profiles, which can include merchant profiles, customer profiles, and so on. Alternatively or additionally, the datastore 1644 can store the artist data 124 and/or model(s) 128 for access over the network(s) 1606 by various user devices 1602 and/or server(s) 1604.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1644 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1644 can store additional or alternative types of data as described herein.

In some aspects, the techniques described herein relate to a computer-implemented method including: receiving a request to generate collaboration recommendations for an artist; processing, by a collaboration system, artist data for the artist with additional artist data for other artists in an artist population; filtering the other artists in the artist population to a subset of one or more artists based on contextual attributes included in the artist data for the artist and additional artist data for other artists; generating the collaboration recommendations for the artist to include the subset of one or more artists; and exposing, via a user interface of the collaboration system, the collaboration recommendations, the collaboration recommendations recommending at least one of the other artists as a collaborator for the artist.

In some aspects, the techniques described herein relate to a computer-implemented method, wherein the collaboration system includes one or more machine learning models, the one or more machine learning models configured to generate the collaboration recommendations for the artist by processing the artist data and the additional artist data for the other artists in the artist population to derive the contextual attributes and generate relevancy scores based on the contextual attributes, the relevancy scores indicating a collaboration relevancy between the artist and the other artists in the artist population.

In some aspects, the techniques described herein relate to a computer-implemented method, wherein the subset of one or more artists is selected to be included in the collaboration recommendations based on the relevancy scores.

In some aspects, the techniques described herein relate to a computer-implemented method, wherein the artist data includes audience data for an audience of the artist, and wherein the relevancy scores are based at least in part on an overlap between the audience of the artist and respective audiences of the other artists in the artist population.

In some aspects, the techniques described herein relate to a computer-implemented method, wherein the artist data includes audience data for an audience of the artist, and wherein the relevancy scores are based at least in part on a potential of growth of the audience of the artist to include users of respective audiences of the other artists in the artist population.

In some aspects, the techniques described herein relate to a computer-implemented method, wherein the one or more machine learning models are trained using a training data set that includes acceptable and unacceptable collaboration recommendations.

In some aspects, the techniques described herein relate to a computer-implemented method, further including forming a communication channel between the artist and the collaborator based on contextual attributes indicative of communication behavior of at least one of artist or the collaborator.

In some aspects, the techniques described herein relate to a computer-implemented method, wherein the communication channel enables the artist to initiate communications with the collaborator but prevents the collaborator from initiating communications with the artist.

In some aspects, the techniques described herein relate to a computer-implemented method including: storing, in one or more databases, artist data for a plurality of artists registered with a collaboration system; generating collaboration matches by processing the artist data by one or more models of the collaboration system using machine learning, each of the collaboration matches including a match between at least two artists of the plurality of artists registered with the collaboration system; filtering the collaboration matches based on contextual attributes included in the artist data; and exposing filtered collaboration matches as collaboration recommendations to at least a subset of the plurality of artists.

In some aspects, the techniques described herein relate to a computer-implemented method, wherein the generating collaboration matches further includes: generating collaboration match scores between artists of the plurality of artists registered with the collaboration system; and generating a collaboration match if a respective collaboration match score for at least two artists is above a threshold.

In some aspects, the techniques described herein relate to a computer-implemented method, wherein the respective collaboration match score for an artist and a collaborator is based on one or more of a popularity of the artist and the collaborator, a genre of the artist and the collaborator, or a likelihood that the artist will collaborate with the collaborator.

In some aspects, the techniques described herein relate to a computer-implemented method, further including: exposing a collaboration recommendation to an artist while preventing the collaboration recommendation from being exposed to a collaborator; or exposing the collaboration recommendation to the collaborator while preventing the collaboration recommendation from being exposed to the artist.

In some aspects, the techniques described herein relate to a computer-implemented method, wherein at least one collaboration match is based on a first artist of the plurality of artists holding an event within a threshold distance of a location associated with a second artist of the plurality of artists.

In some aspects, the techniques described herein relate to a computer-implemented method, wherein the generating collaboration matches further includes: generating a fingerprint for each artist of the plurality of artists by processing the artist data associated with each respective artist; and comparing fingerprints to identify the collaboration matches.

In some aspects, the techniques described herein relate to a computer-implemented method, wherein the one or more models are trained using training data that includes historical collaboration matches between artists.

In some aspects, the techniques described herein relate to a computer-implemented method, wherein the one or more models are trained by adjusting internal weights of the one or more models based on whether the one or more models recommend a collaboration that is acceptable or unacceptable based on the historical collaboration matches.

In some aspects, the techniques described herein relate to a computer-implemented method including: receiving, by a collaboration system, a request from a user to register as an artist with the collaboration system, the request including registration data; processing, by the collaboration system, the registration data to verify that the user is the artist; and responsive to determining that the user is the artist, registering the artist with the collaboration system to enable the artist to receive collaboration recommendations, the collaboration recommendations received by the artist being filtered based on contextual attributes derived in part from the registration data.

In some aspects, the techniques described herein relate to a computer-implemented method, wherein the registration data includes one or more social media accounts of the user, one or more email addresses of the user, or biometric information of the user.

In some aspects, the techniques described herein relate to a computer-implemented method, further including generating a collaboration recommendation for the artist, the collaboration recommendation recommending at least one additional artist registered with the collaboration system as a collaborator for the artist.

In some aspects, the techniques described herein relate to a computer-implemented method, further including generating an additional collaboration recommendation for at least one additional artist, the additional collaboration recommendation recommending the artist as a collaborator for the at least one additional artist.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer-implemented method comprising:
receiving a request to generate collaboration recommendations for an artist, the request including a specific collaboration objective, the specific collaboration objective comprising at least one of growing an audience of the artist or engaging the audience of the artist;
processing, by one or more machine learning models of a collaboration system, artist data for the artist with additional artist data for other artists in an artist population in order to identify similar collaborators with audiences which overlap the audience of the artist and to identify dissimilar collaborators with audiences which do not overlap the audience of the artist;
filtering the other artists in the artist population to a subset of one or more artists satisfying the specific collaboration objective based on contextual attributes included in the artist data for the artist and additional artist data for other artists;
generating, by one or more machine learning models of the collaboration system, the collaboration recommendations for the artist to include the subset of one or more artists, the one or more collaboration recommendations generated based on the specific collaboration objective to grow the audience of the artist by recommending collaborations with dissimilar collaborators, wherein the one or more machine learning models leverage a social graph that is generated by the collaboration system from the artist data, the social graph including artist nodes that represent artists and content consumer nodes that represent content consumers, the social graph including edges that connect the content consumer nodes to one or more of the artist nodes that the content consumers have listened to or interacted with, and wherein the edges are weighted based on one or more of a number of listens, amount of listening, or amount of digital interaction;
exposing, via a user interface of the collaboration system, the collaboration recommendations, the collaboration recommendations recommending at least one of the other artists that satisfy the collaboration objective as a collaborator for the artist, wherein the one or more machine learning models are trained using training data that includes historical collaboration matches between artists, and wherein the one or more machine learning models are trained to optimize for the specific collaboration objective by generating outputs corresponding to collaboration matches and rewarding acceptable collaboration matches by adjusting internal weights of the one or more machine learning models to encourage similar acceptable outputs and discouraging unacceptable collaboration matches by adjusting internal weights of the one or more machine learning models to discourage similar unacceptable outputs;
receiving, via the user interface, a selection of the collaborator;

forming, by the collaboration system, a communication channel between the artist and the collaborator; and communicating, via the communication channel, an electronic message from the artist to the collaborator.

2. The computer-implemented method of claim 1, wherein the subset of one or more artists is selected to be included in the collaboration recommendations based on relevancy scores.

3. The computer-implemented method of claim 2, wherein the artist data includes audience data for an audience of the artist, and wherein the relevancy scores are based at least in part on an overlap between the audience of the artist and respective audiences of the other artists in the artist population.

4. The computer-implemented method of claim 2, wherein the artist data includes audience data for an audience of the artist, and wherein the relevancy scores are based at least in part on a potential of growth of the audience of the artist to include users of respective audiences of the other artists in the artist population.

5. The computer-implemented method of claim 1, wherein the training data includes acceptable and unacceptable collaboration recommendations.

6. The computer-implemented method of claim 1, wherein the communication channel enables the artist to initiate communications with the collaborator but prevents the collaborator from initiating communications with the artist.

7. The computer-implemented method of claim 1, wherein the one or more machine learning models are further trained to optimize for the specific collaboration objective by determining artists which would be relevant to the artist based on a gap in the audience of the artist.

8. The computer-implemented method of claim 7, wherein a group of users of the collaborator's audience are not part of the audience of the artist.

9. The computer-implemented method of claim 1, further comprising generating and surfacing a recommendations regarding one or more platforms to place the collaboration after the collaboration is produced by the artist and the collaborator.

10. The computer-implemented method of claim 9, wherein the one or more platforms comprise one or more of television, a streaming application, a social networking platform, or a mobile application.

11. The computer-implemented method of claim 1, wherein the one or more machine learning models configured to generate the collaboration recommendations for the artist by processing the artist data and the additional artist data for the other artists in the artist population to derive the contextual attributes and generate relevancy scores based on the contextual attributes, the relevancy scores indicating a collaboration relevancy between the artist and the other artists in the artist population.

12. A computer-implemented method comprising:

storing, in one or more databases, artist data for a plurality of artists registered with a collaboration system;

receiving a request to generate collaboration recommendations for an artist, the request including a specific collaboration objective to grow an audience of the artist or;

generating collaboration matches by processing the artist data by one or more models of the collaboration system using machine learning, the collaboration matches generated based on the specific collaboration objective to grow the audience of the artist by recommending collaborations with dissimilar collaborators, the dissimilar collaborators having audiences which do not overlap an audience of the artist, each of the collaboration matches including a match between at least two artists of the plurality of artists registered with the collaboration system, wherein the one or more models are trained using training data that includes historical collaboration matches between artists, and wherein the one or more models are trained to optimize for the specific collaboration objective by generating outputs corresponding to collaboration matches and rewarding acceptable collaboration matches by adjusting internal weights of the one or more machine learning models to encourage e similar acceptable outputs and discouraging unacceptable collaboration matches by adjusting internal weights of the one or more machine learning models to discourage similar unacceptable outputs, wherein the one or more machine learning models leverage a social graph that is generated by the collaboration system from the artist data, the social graph including artist nodes that represent artists and content consumer nodes that represent content consumers, the social graph including edges that connect the content consumer nodes to one or more of the artist nodes that the content consumers have listened to or interacted with, and wherein the edges are weighted based on one or more of a number of listens, amount of listening, or amount of digital interaction;

filtering the collaboration matches based on contextual attributes included in the artist data; and exposing, via a user interface, filtered collaboration matches as collaboration recommendations to at least a subset of the plurality of artists;

receiving, via the user interface, a selection of a collaborator from the exposed filtered collaboration matches;

forming, by the collaboration system, a communication channel between the artist and the collaborator; and communicating, via the communication channel, an electronic message from the artist to the collaborator.

13. The computer-implemented method of claim 12, wherein the generating collaboration matches further comprises:

generating collaboration match scores between artists of the plurality of artists registered with the collaboration system; and generating a collaboration match if a respective collaboration match score for at least two artists is above a threshold.

14. The computer-implemented method of claim 13, wherein the respective collaboration match score for an artist and a collaborator is based on one or more of a popularity of the artist and the collaborator, a genre of the artist and the collaborator, or a likelihood that the artist will collaborate with the collaborator.

15. The computer-implemented method of claim 12, further comprising:

exposing a collaboration recommendation to an artist while preventing the collaboration recommendation from being exposed to a collaborator; or exposing the collaboration recommendation to the collaborator while preventing the collaboration recommendation from being exposed to the artist.

16. The computer-implemented method of claim 12, wherein at least one collaboration match is based on a first artist of the plurality of artists holding an event within a threshold distance of a location associated with a second artist of the plurality of artists.

17. The computer-implemented method of claim 12, wherein the generating collaboration matches further comprises:
- generating a fingerprint for each artist of the plurality of artists by processing the artist data associated with each respective artist; and
- comparing fingerprints to identify the collaboration matches.

18. A computer-implemented method comprising:
- receiving, by a collaboration system, a request from a user to register as an artist with the collaboration system, the request including registration data;
- processing, by the collaboration system, the registration data to verify that the user is the artist; and
- responsive to determining that the user is the artist, registering the artist with the collaboration system to enable the artist to receive collaboration recommendations, the collaboration recommendations received by the artist being filtered based on contextual attributes derived in part from the registration data;
- generating a collaboration recommendation for the artist using one or more machine learning models, the collaboration recommendation recommending at least one additional artist registered with the collaboration system as a collaborator for the artist, the collaboration recommendation generated based on a specific collaboration objective to grow an audience of the artist by recommending collaborations with dissimilar collaborators, the dissimilar collaborators having audiences which do not overlap an audience of the artist, wherein the one or more machine learning models are trained using training data that includes historical collaboration matches between artists, wherein the one or more machine learning models are trained to optimize for the specific collaboration objective by generating outputs corresponding to collaboration matches and rewarding acceptable collaboration matches by adjusting internal weights of the one or more machine learning models to encourage similar acceptable outputs and discouraging unacceptable collaboration matches by adjusting internal weights of the one or more machine learning models to discourage similar unacceptable outputs, wherein the one or more machine learning models leverage a social graph that is generated by the collaboration system from the artist data, the social graph including artist nodes that represent artists and content consumer nodes that represent content consumers, the social graph including edges that connect the content consumer nodes to one or more of the artist nodes that the content consumers have listened to or interacted with, and wherein the edges are weighted based on one or more of a number of listens, amount of listening, or amount of digital interaction;
- receiving, via a user interface, a selection of the collaborator;
- forming, by the collaboration system, a communication channel between the artist and the collaborator; and
- communicating, via the communication channel, an electronic message from the artist to the collaborator.

19. The computer-implemented method of claim 18, wherein the registration data includes one or more social media accounts of the user, one or more email addresses of the user, or biometric information of the user.

20. The computer-implemented method of claim 18, further comprising generating an additional collaboration recommendation for at least one additional artist, the additional collaboration recommendation recommending the artist as a collaborator for the at least one additional artist.

* * * * *